US00RE41093E

(19) United States
(12) Reissued Patent
Lutz et al.

(10) Patent Number: US RE41,093 E
(45) Date of Reissued Patent: Feb. 2, 2010

(54) METHOD OF MONITORING ITEM SHUFFLING IN A POST-SCAN AREA OF A SELF-SERVICE CHECKOUT TERMINAL

(75) Inventors: Dusty L. Lutz, Dacula, GA (US); Christopher A. Malchak, Alpharetta, GA (US); Timothy E. Mason, Buford, GA (US); Ali M. Vassigh, Stevensville, MI (US)

(73) Assignee: NCR Corporation, Dayton, OH (US)

(21) Appl. No.: 10/038,377
(22) Filed: Oct. 19, 2001

Related U.S. Patent Documents

Reissue of:
(64) Patent No.: 5,967,264
Issued: Oct. 19, 1999
Appl. No.: 09/071,024
Filed: May 1, 1998

(51) Int. Cl.
*A63F 9/02* (2006.01)

(52) U.S. Cl. ..... 186/61; 235/383
(58) Field of Classification Search ..... 186/61, 186/62, 66; 235/383
See application file for complete search history.

(56) References Cited

U.S. PATENT DOCUMENTS

| | | | |
|---|---|---|---|
| 3,182,357 | A | 5/1965 | Tuttle |
| 3,688,873 | A | 9/1972 | Potrafke |
| 3,725,895 | A | 4/1973 | Haynes |

(Continued)

FOREIGN PATENT DOCUMENTS

| | | |
|---|---|---|
| BE | 899018 | 6/1984 |
| DE | 1927819 | 2/1971 |
| DE | 2125869 | 12/1972 |

(Continued)

OTHER PUBLICATIONS

Search Results List: 8 Articles listed; Word or Phrase: Self and (checkout or scan?) and automat? and teller and mach, Date range: 1998—Present; print date Apr. 3, 2000.
Search Results List: 7 Articles listed; Word or Phrase: Self and (checkout or scan?) and automat? and teller and mach, Date range: Backfile (1996–1997); print date Apr. 3, 2000.
Search Results List by Rank: 100 Articles listed; Search criteria Self–Checkout Coupled To An Automated Teller Machine; print date Mar. 29, 2000.
U–Scan Express.TM., The U–Scan Express.TM. Self–Checkout System, Spectra–Physics Scanning Systems, Inc., Feb. 1996.

(Continued)

*Primary Examiner*—Jeffrey A Shapiro
(74) *Attorney, Agent, or Firm*—Paul W. Martin; Priest & Goldstein, PLLC

(57) ABSTRACT

A method of monitoring item shuffling in a post-scan area of a self-service checkout terminal having a post-scan shelf, a bagwell with a grocery container positioned therein, and a weight scale positioned so as to detect weight of items positioned both on the post-scan shelf and in the grocery container, includes the step of detecting removal of a first number of items from the post-scan shelf with the weight scale and generating a first weight decrease value in response thereto which corresponds to the weight of the first number of items. The method also includes the step of detecting placement of a second number of items into the grocery container with the weight scale and generating a first weight increase value in response thereto which corresponds to the weight of the second number of items. The method further includes the step of comparing the first weight decrease value to the first weight increase value and generating a first match control signal in response thereto if the first weight decrease value matches the first weight increase value.

57 Claims, 11 Drawing Sheets

U.S. PATENT DOCUMENTS 3,836,755 A 9/1974 Ehrat
3,878,365 A 4/1975 Schwartz ..... 235/61.7 R
4,071,740 A 1/1978 Gogulski
4,084,742 A 4/1978 Silverman
4,373,133 A 2/1983 Clyne et al.
4,583,083 A 4/1986 Bogasky
4,583,619 A 4/1986 Fry
4,661,908 A 4/1987 Hamano et al. ..... 364/405
4,676,343 A 6/1987 Humble et al.
4,679,154 A 7/1987 Blanford
4,715,457 A 12/1987 Amacher et al.
4,775,782 A 10/1988 Mergenthaler et al.
4,779,706 A 10/1988 Mergenthaler ..... 186/61
4,787,467 A 11/1988 Johnson ..... 235/383
4,789,048 A 12/1988 Cramer et al.
4,792,018 A * 12/1988 Humble et al. ..... 186/61
4,909,356 A 3/1990 Rimondi et al.
4,929,819 A 5/1990 Collins, Jr.
4,940,116 A 7/1990 O'Connor et al.
4,947,028 A 8/1990 Gorog
4,964,053 A 10/1990 Humble
5,004,916 A 4/1991 Collins, Jr.
5,040,636 A 8/1991 Forsythe et al.
5,083,638 A * 1/1992 Schneider ..... 186/61
5,115,888 A 5/1992 Schneider
5,123,494 A 6/1992 Schneider
5,125,465 A 6/1992 Schneider ..... 177/50
5,168,961 A 12/1992 Schneider
5,174,413 A 12/1992 Cappi et al.
5,191,749 A 3/1993 Cappi et al. ..... 53/502
5,250,789 A 10/1993 Johnsen
5,297,030 A 3/1994 Vassigh et al.
5,315,097 A 5/1994 Collins, Jr. et al.
5,340,970 A 8/1994 Wolfe, Jr. et al.
5,343,025 A 8/1994 Usui
5,345,071 A 9/1994 Dumont
5,361,871 A 11/1994 Gupta et al.
5,375,680 A 12/1994 Ikeda et al.
5,378,860 A * 1/1995 Dingfelder et al. ..... 177/25.19
5,397,882 A 3/1995 Van Solt
5,398,191 A 3/1995 Komai
5,424,524 A 6/1995 Ruppert et al.
5,426,282 A 6/1995 Humble
5,426,423 A 6/1995 Raimbault et al.
5,434,394 A 7/1995 Roach et al.
5,437,346 A * 8/1995 Dumont ..... 186/61
5,448,046 A 9/1995 Swartz
5,457,307 A 10/1995 Dumont
5,484,991 A 1/1996 Sherman et al.
5,485,006 A 1/1996 Allen et al.
5,489,773 A 2/1996 Kumar
5,494,136 A 2/1996 Humble
5,497,314 A 3/1996 Novak
5,497,853 A 3/1996 Collins, Jr. et al.
5,540,301 A 7/1996 Dumont
5,543,607 A 8/1996 Watanabe et al.
5,544,040 A 8/1996 Gerbaulet
5,560,450 A 10/1996 Kouno
5,595,264 A 1/1997 Trotta, Jr.
5,609,223 A 3/1997 Iizaka et al.
5,635,906 A 6/1997 Joseph
5,637,847 A 6/1997 Watanabe ..... 235/383
5,662,190 A * 9/1997 Abe ..... 186/61
5,663,963 A 9/1997 Goodwin, III
5,684,289 A 11/1997 Detwiler et al.
5,721,420 A 2/1998 May
5,736,721 A 4/1998 Swartz
5,752,582 A 5/1998 Hayward
5,814,799 A 9/1998 Swartz et al.
5,821,512 A 10/1998 O'Hagan et al.
5,845,263 A 12/1998 Camaisa et al.
5,877,485 A 3/1999 Swartz
5,883,968 A 3/1999 Welch et al.
5,884,728 A 3/1999 d'Estaintot et al.
5,898,158 A 4/1999 Shimizu et al. ..... 235/383
5,900,614 A 5/1999 Nakakawaji et al.
5,923,735 A 7/1999 Swartz et al.
5,978,772 A 11/1999 Mold

FOREIGN PATENT DOCUMENTS

DE 3114139 A1 11/1982
DE 3330301 A1 3/1985
EP 0060701 B1 9/1982
EP 0124355 B1 11/1984
EP 0178223 A2 4/1986
EP 0491348 A2 6/1992
EP 0498311 A 8/1992
EP 0654477 A 5/1995
EP 0811958 A2 12/1997
EP 0905656 A2 3/1999
GB 2068132 A 8/1981
GB 2193000 B 7/1987
GB 2285687 A 7/1995
JP 5314367 11/1993
JP 11328299 11/1999

OTHER PUBLICATIONS

Optimal Robotics 8870 System. TM., Optimal Robotics Corporation, 1995.

Zimmerman, Denise, "Kroger Unit to Expand Customer Self–Scanning", Supermarket News, Aug. 14, 1995, p. 15.

Zimmerman, Denise, "Kroger Self–Scan Lane To Test Debit Credit" Supermarket News, vol. 45, No. 14, p. 13+, Apr. 3, 1995.

Lang Jones, Jeanne, "Robots Will Do Checkout at Grocery", Houston Post, (Final, Business, p. C1, Feb. 22, 1995.

"Burger King Tests Credit–Card Payments", The Miami Herald Knight–Rider/Tribune Business News, Jul. 9, 1993.

Wisemberg–Brin, Dinah, Associated Press, "You–buy, you–scan bag", Dayton Daily News, Aug. 11, 1996.

Gamburer, A.T., et al., "Analogue–code Converter Used with Strain Gauge Hopper Weighers", Instrumental and Control, Mar. 3, 1969.

"Optimal Robotics Selects Diebold's ATM Cash Dispensing Technology; Industry Leading U–Scan Express Self–Checkout System To Incorporate Diebold ATM Dispensers", Business Wire, Dec. 20, 1999.

Amato–McCoy, Deena, "Brookshire's Shoppers Will Soon Experience Ease and Conveniene of NCR Self–Checkout; NCR Self–Checkout Express Lets Shoppers Scan and Pay for Their Purchases", PR Newswire, Feb. 24, 1999.

Amato–McCoy, "Self–Checkout Test Planned at Brookshire Grocery Units", Supermarket News Page: 21(1), Apr. 26, 1999.

"More Supermarkets Can Offer Shoppers Ease and Convenience of NCR Self–Checkout", PR Newswire, Feb. 16, 1999.

Power, Denise, "Self–Scanning Checks In. (Meijer)", HFN The Weekly Newspaper for the Home Furnishing Network, vol. 72, Issue No. 36, Sep. 14, 1998.

Web pages: http://www.terrigal.net.au/kjka/www.pscnet.com/uscanspe.htm, U–Scan Express(tm) Self–Checkout, Mar. 29, 2000.

Zimmerman, Kim Ann, "Food Lion To Install More Self–Checkouts", Supermarket News, Oct. 4, 1999.

"NCR: NCR Unveils Retail Self–Service Solution", M2 Presswire, Jun. 16, 1998.
Corbin, Cole, "Checking Out Self–Scanning: More Retailers Are Singing the Praises of Both Portable and Stationary Self–Scanning, But Customers Still Need a Bit of Wooing", Supermarket News, Mar. 15, 1999.
Moltzen, Edward F., "NCR, Innovax Team For Supermarket Sweep", Computer Reseller News, Feb. 22, 1999.
Abstract: Woodyard, Chris, "Grocery Shoppers Can Be Own Cashiers", USA Today, Mar. 9, 1998.

* cited by examiner

DISPLAY INSTRUCTIONS
60
SET $D_X = 0$; $D_Y = 0$; $I_X = 0$; $I_Y = 0$
62
ITEM ENTRY ?
64
YES
NO
WEIGHT INCREASE ?
66
YES
NO
WEIGHT DECREASE ?
68
YES
NO
WEIGHT INCREASE ?
72
YES
NO
UPDATE LOG
184
SET $D_X$ = NEW VALUE
70
56

BEGIN
ONE OR TWO ITEMS DISPLACED
108
$I_X = 0$ ?
110
YES
NO
ITEM ENTRY ?
112
YES
NO
END
WEIGHT INCREASE ?
116
YES
NO
SET $I_X$ = NEW VALUE
118
WEIGHT DECREASE ?
120
YES
NO
SET $D_X = D_Y$; $D_Y$ = NEW VALUE
142
$I_X = D_X + D_Y$ ?
122
YES
NO
END

METHOD OF MONITORING ITEM SHUFFLING IN A POST-SCAN AREA OF A SELF-SERVICE CHECKOUT TERMINAL

Matter enclosed in heavy brackets [ ] appears in the original patent but forms no part of this reissue specification; matter printed in italics indicates the additions made by reissue.

TECHNICAL FIELD OF THE INVENTION

The present invention relates generally to a retail checkout terminal, and more particularly to a method of monitoring item shuffling in a post-scan area of a self-service checkout terminal.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for a checkout clerk.

A self-service checkout terminal is a system which is operated by a customer or user without the aid of a checkout clerk. In such a system, the customer scans individual items for purchase across a scanner and then places the scanned item into a grocery bag, if desired. The customer then pays for his or her purchase either at the self-service checkout terminal if so equipped, or at a central payment area which is staffed by a store employee. Thus, a self-service checkout terminal permits a customer to select, itemize, and in some cases pay for his or her purchase without the assistance of the retailer's personnel.

A customer typically has little or no training in the operation of a self-service checkout terminal prior to his or her initial use of the checkout terminal. One concern that retailers have when evaluating a self-service checkout terminal is the level of supervision provided to inexperienced customers. Moreover, it is also known that some customers may have improper intentions when using a self-service checkout terminal. In traditional checkout systems, the clerk employed by the retailer to operate the checkout terminal provides a level of security against theft or other improprieties. However, in the case of a self-service checkout terminal, the terminal itself must provide the necessary security.

Moreover, it is desirable to allow a customer to move or shuffle items which have previously been scanned or otherwise entered in the self-service checkout terminal so as to facilitate operation of the terminal. For example, after a customer scans a loaf of bread, it is desirable to allow the customer to place the bread on a post-scan shelf or the like until later in the transaction at a point in time at which the customer may place the bread in a nearly full grocery bag thereby preventing the bread from being crushed. However, one drawback associated with permitting the customer to perform such shuffling of entered items is that it becomes necessary for the security system of the self-service checkout terminal to differentiate between entered items and unentered items. In particular, it is desirable to provide a security system for the self-service checkout terminal that reduces the number of occasions in which a customer places an unscanned or otherwise unentered item into a grocery bag or a post-scan shelf.

What is needed therefore is a self-service checkout terminal which overcomes one or more of the above-mentioned drawbacks. What is also needed is a self-service checkout terminal which allows the shuffling of scanned or otherwise entered items in a post-scan of the self-service checkout terminal, but reduces the number of occasions in which a customer places an unscanned or otherwise unentered item into a grocery bag or a post-scan shelf.

SUMMARY OF THE INVENTION

In accordance with a first embodiment of the present invention, there is provided a method of monitoring item shuffling in a post-scan area of a self-service checkout terminal. The post-scan area includes a post-scan surface. The method includes the step of detecting removal of a first number of items from the post-scan surface and generating a first weight decrease value in response thereto which corresponds to the weight of the first number of items. The method also includes the step of detecting placement of a second number of items onto the post-scan surface and generating a first weight increase value in response thereto which corresponds to the weight of the second number of items. Moreover, the method includes the step of comparing the first weight decrease value to the first weight increase value and generating a first match control signal in response thereto if the first weight decrease value matches the first weight increase value.

In accordance with a second embodiment of the present invention, there is provided a method of monitoring item shuffling in a post-scan area of a self-service checkout terminal having a post-scan shelf, a bagwell with a grocery container positioned therein, and a weight scale positioned so as to detect weight of items positioned both on the post-scan shelf and in the grocery container. The method includes the step of detecting removal of a first number of items from the post-scan shelf with the weight scale and generating a first weight decrease value in response thereto which corresponds to the weight of the first number of items. The method also includes the step of detecting placement of a second number of items into the grocery container with the weight scale and generating a first weight increase value in response thereto which corresponds to the weight of the second number of items. The method further includes the step of comparing the first weight decrease value to the first weight increase value and generating a first match control signal in response thereto if the first weight decrease value matches the first weight increase value.

It is therefore an object of the present invention to provide a new and useful method of monitoring item shuffling in a post-scan area of a self-service checkout terminal.

It is moreover an object of the present invention to provide an improved method of monitoring item shuffling in a post-scan area of a self-service checkout terminal.

It is yet another object of the present invention to provide a method of monitoring item shuffling in a post-scan area of a self-service checkout terminal which would detect when a user places an unscanned or otherwise unentered item into a grocery bag or onto a post-scan shelf.

It is also an object of the present invention to provide a method of monitoring item shuffling in a post-scan area of a self-service checkout terminal which reduces the instances of improprieties such a theft.

The above and other objects, features, and advantages of the present invention will become apparent from the following description and the attached drawings.

DETAILED DESCRIPTION OF THE INVENTION

Figure 1:
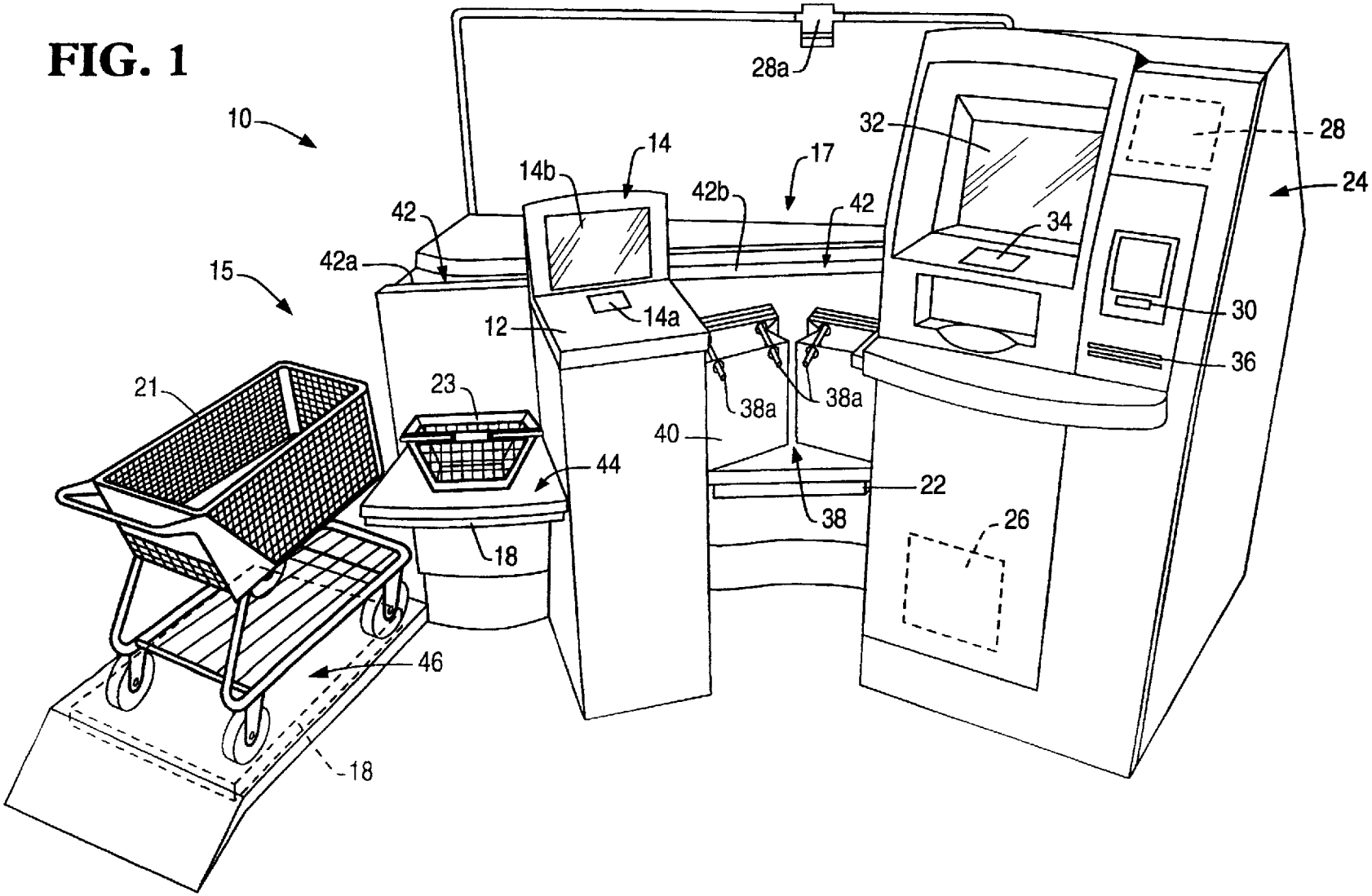
FIG. 1 is a perspective view of a self-service checkout terminal which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
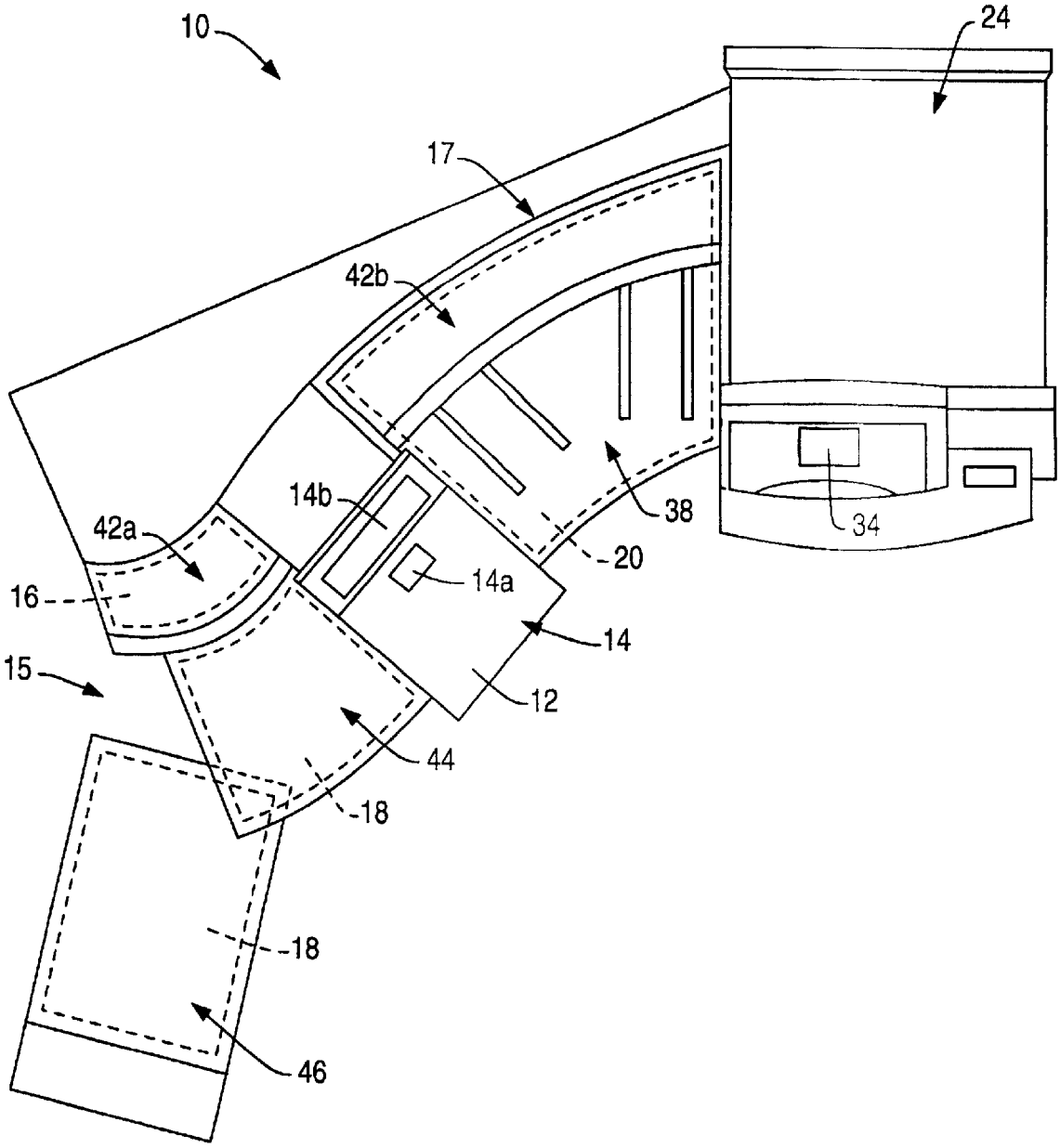
FIG. 2 is a top elevational view of the self-service checkout terminal of FIG. 1 (note that the grocery cart 21, the grocery hand basket 23, the video camera 28a, and the grocery bags 40 have been removed for clarity of description)

Referring now to FIGS. 1 and 2, there is shown a self-service checkout terminal 10 for use in a retail business such as a grocery store. The self-service checkout terminal 10 includes a product scale 12, a scanner 14, a pre-scan shelf scale 16, a cart/basket scale 18, a post-scan scale 20, an automated teller machine (ATM) 24, and a processing unit 26. The ATM 24 includes a video system 28, a card reader 30, a display monitor 32, a data input device 34, and a printer 36.

The self-service checkout terminal 10 also includes a bagwell 38 for accommodating one or more grocery containers or bags 40, a counter 42, and a basket shelf 44. The counter 42 defines an arcuate surface as shown in FIG. 2. Such an arcuate surface allows the counter 42 to be positioned relatively close to both the scanner 14 and the bagwell 38 thereby permitting the counter 42 to function as a "set-aside surface" for use by the user during operation of the self-service checkout terminal 10. Such set-aside surfaces are necessary to allow the user to selectively choose the order in which items are scanned or otherwise entered. Moreover, such set-aside surfaces are necessary to allow a user to selectively choose the order in which items are loaded into the grocery bags 40. For example, if the user scanned a loaf of bread, the user may wait to load the bread into the grocery bag 40 until the bag is nearly full thereby preventing the bread from being crushed. As alluded to above, it may be desirable to use the set-aside surfaces both before and after an item has been scanned or otherwise entered. Hence, as shown in FIG. 2, the scanner 14 divides the counter 42 into a pre-scan set-aside shelf 42a, and a post-scan set-aside shelf 42b. In particular, the scanner 14 divides the counter 42 into the pre-scan set-aside shelf 42a which is upstream of the scanner 14, and the post-scan set-aside shelf 42b which is downstream from the scanner 14. The terms "upstream" and "downstream" are used to be consistent with the flow of items through the self-service checkout terminal 10 during a typical checkout procedure. In particular, an item enters at the area proximate the pre-scan set-aside shelf 42a then flows in a downstream direction to be scanned at the scanner 14 so as to enter a product code associated with the item. Once the product code associated with the item is entered, the item flows from the scanner 14 in a downstream direction to the post-scan set-aside shelf 42b or the bagwell 38.

The bagwell 38 is disposed between the scanner 14 and the ATM 24 as shown in FIG. 1. The bagwell 38 includes a number of posts 38a which cooperate to support a number of the grocery bags 40. The bagwell 38 is configured to allow two or more grocery bags 40 to be accessed by the user at any given time. In particular, the posts 38a are of a sufficient length to secure a number of unopened grocery bags 40 along with two or more opened grocery bags 40 thereby allowing a user to selectively load various item types into the grocery bags 40. For example, the user may desire to use a first grocery bag 40 for household chemical items such as soap or bleach, and a second grocery bag 40 for edible items such as meat and produce.

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a first scanning window 14a and a second scanning window 14b. The first scanning window 14a is disposed in a substantially horizontal manner, whereas the second scanning window 14b is disposed in a substantially vertical manner, as shown in FIG. 1. The product scale 12 is integrated with the scanner 14. More specifically, the product scale 12 is disposed substantially parallel to the scanning window 14a thereby enveloping the scanning window 14a. If an item such as produce is placed upon the product scale 12 or the first scanning window 14a, the product scale 12 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid product identification code pattern. If a valid code pattern is present, the product identification code is then converted into pricing information which is then used to determine the cost of the item in a known manner.

The pre-scan shelf scale 167 is positioned in order to determine the weight of an item or items positioned on the pre-scan shelf 42a. In particular, if a user removes an item from the pre-scan shelf 42a in order to scan or otherwise enter the item into the self-service checkout terminal 10, the pre-scan shelf scale 16 may be used to determine the weight of the item by detecting a weight decrease associated with removal of the item from the pre-scan shelf 42a. Moreover, the pre-scan shelf 42a functions as a "return area" of the self-service checkout specifically, if the user voids an item from entry during the checkout procedure, the user is instructed via a message displayed on the display monitor 32 to position the voided item on the pre-scan shelf 42a. Hence, the pre-scan shelf scale 16 may be used to determine the weight associated with the voided item by detecting a weight increase associated with placement of the voided item on the pre-scan shelf 42a.

The cart/basket scale 18 is positioned in order to determine the weight of an item or items positioned in either (1) a grocery cart 21 positioned on a cart unloading platform 46, and/or (2) a grocery hand basket 23 positioned on the basket shelf 44. In particular, if a user removes an item from either the grocery cart 21 or the grocery hand basket 23 in order to scan or otherwise enter the item into the self-service checkout terminal 10, the cart/basket scale 18 may be used to determine the weight of the item by detecting a weight decrease associated with removal of the item from either the grocery cart 21 or the grocery hand basket 23, respectively. It should be appreciated that the cart/basket scale 18 may be embodied as two separate scales (i.e. a first scale for detecting weight changes on the cart unloading platform 46, and second scale for detecting weight changes on the basket shelf 44), or may preferably be embodied as a single, integrated weight scale which is mechanically coupled to both the cart unloading platform 46 and the basket shelf 44.

From the above discussion, it should be appreciated that the pre-scan shelf scale 16 and the cart/basket scale 18 cooperate to monitor placement of items into, and removal of items from, a pre-scan area 15 associated with the self-service checkout terminal 10. What is meant herein by the term "pre-scan area" is the area associated with the self-service checkout terminal 10 in which items may be placed prior to being scanned or otherwise entered into the self-service checkout terminal 10. For example, the pre-scan area 15 includes the pre-scan shelf 42a, the cart unloading platform 46, and the basket shelf 44.

The post-scan scale 20 is positioned in order to determine the weight of an item or items positioned (1) on the weight shelf 42b, and/or (2) in the bagwell 38 (i.e. into one of the grocery bags 40). In particular, if a user places an item on the post-scan shelf 42b or into one of the grocery bags 40, the post-scan scale 20 may be used to determine the weight of the item by detecting a weight increase associated with placement of the item on the post-scan shelf 42b or into one of the grocery bags 40. Alternatively, if a user removes an item from the post-scan shelf 42b or one of the grocery bags 40, the post-scan scale 20 may be used to determine the weight of the item by detecting a weight decrease associated with removal of the item from the post-scan shelf 42b or one of the grocery bags 40.

From the above discussion, it should be appreciated that the post-scan scale 20 monitors placement of items into, and removal of items from, a post-scan area 17 associated with the self-service checkout terminal 10. What is meant herein by the term "post-scan area" is the area associated with the self-service checkout terminal 10 in which items may be placed subsequent to being scanned or otherwise entered into the self-service checkout terminal 10. For example, the post-scan area 17 includes the post-scan shelf 42b and the bagwell 38 (including the grocery bags 40 therein).

It should be further appreciated that the post-scan scale 20 may be used to monitor movement or shuffling of items within the post-scan area 17. In particular, the post-scan scale 20 may be used to monitor movement of items onto and off of a number of post-scan surfaces within the post-scan area 17. What is meant herein by the term "post-scan surface" is any surface within the post-scan area on which an item may be positioned after being scanned or otherwise entered into the self-surface checkout terminal 10. An example of a post-scan would include the post-scan shelf 42b and the base of the bag well 38 on which the grocery bags 40 are positioned. Hence, the post-scan scale 20 may be used to monitor movement of items which had been previously set-aside on the post-scan shelf 42b and thereafter either placed into one of the grocery bags 40 or removed permanently from the self-service checkout terminal 10 (e.g. placed in the user's pocket). For instance, as shall be discussed below in greater detail, the post-scan scale 20 may be used to first determine that an item has been removed from the post-scan shelf 42b by detecting a weight decrease associated with removal of the item. Thereafter, the post-scan scale 20 may be used to determine if the item is then placed into one of the grocery bags 40 by detecting a weight increase associated with placement of the item into one of the grocery bags 40.

The display monitor 32 displays instructions which serve to guide a user through a checkout procedure. For example, an instruction is displayed on the display monitor 32 which instructs the user to remove an item from the grocery cart 21 and enter the item into the self-service checkout terminal 10 by (1) passing the item over the scanner 14, or (2) placing the item on the product scale 12 in order to obtain the weight of the item. The display monitor 32 may be a known touch screen monitor which can generate data signals when certain areas of the screen are touched by a user.

Figure 3:
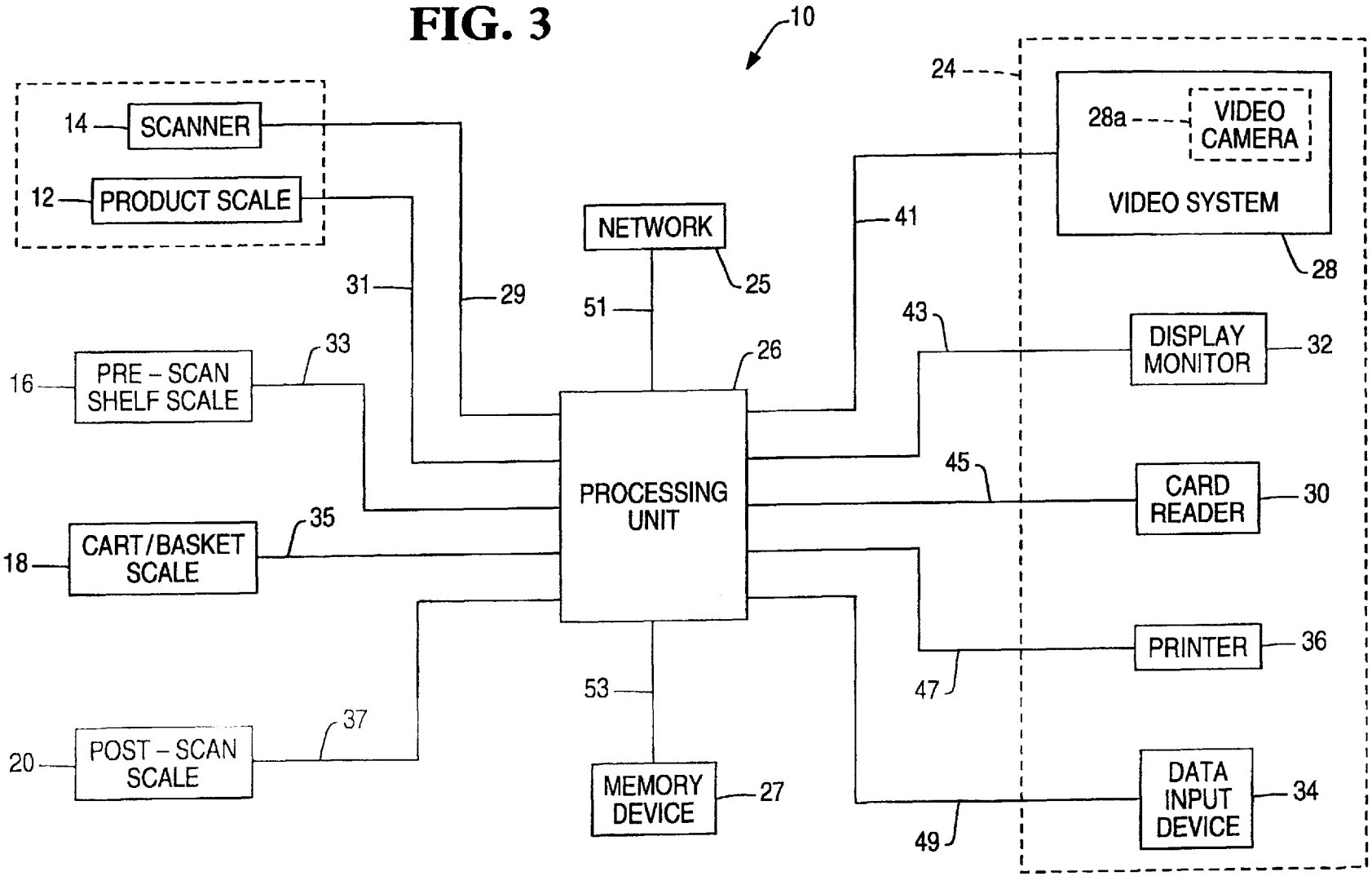
FIG. 3 is a simplified block diagram of the self-service checkout terminal of FIG. 1.

Referring now to FIG. 3, there is shown a simplified block diagram of the self-service checkout terminal 10. The processing unit 26 is electrically coupled to the product scale 12, the scanner 14, the pre-scan shelf scale 16, the cart/basket scale 18, the post-scan scale 20, the video system 28, the card reader 30, the display monitor 32, the data input device 34, and the printer 36. The processing unit 26 is also electrically coupled to a network 25 and a memory device 27 as shown in FIG. 3.

The processing unit 26 monitors output signals generated by the scanner 14 via a communication line 29. In particular, when the user of the self-service checkout terminal 10 scans an item which includes a bar code across the scanning windows 14a, 14b, an output signal is generated on the communication line 29.

The processing unit 26 is coupled to the product scale 12 via a data communication line 31. In particular, when an item is placed thereon, the product scale 12 generates an output signal on the data communication line 31 indicative of the weight of the item.

The processing unit 26 is coupled to the pre-scan shelf scale 16 via a data communication line 33. In particular, when an item is placed on the pre-scan shelf 42a, the pre-scan shelf scale 16 generates an output signal on the data communication line 33 indicative of the weight of the item. Similarly, when an item is removed from the pre-scan shelf 42a, the pre-scan shelf scale 16 generates an output signal on the data communication line 33 indicative of the weight of the removed item.

The processing unit 26 is coupled to the cart/basket scale 18 via a data communication line 35. In particular, when an item is removed from either the grocery cart 21 or the grocery hand basket 23, the cart/basket scale 18 generates an output signal on the data communication line 35 indicative of the weight of the removed item.

The processing unit 26 is coupled to the post-scan scale 20 via a data communication line 37. In particular, when an item is placed on the post-scan shelf 42b or into one of the grocery bags 40, the post-scan scale 20 generates an output signal on the data communication line 37 indicative of the weight of the item. Similarly, when an item is removed from the post-scan shelf 42b or one of the grocery bags 40, the post-scan scale 20 generates an output signal on the data communication line 37 indicative of the weight of the removed item.

The processing unit 26 communicates with the video system 28 via a communication line 41. The video system 28 includes a video camera 28a (see also FIG. 1), and is included in the self-service checkout terminal 10 to enhance the security thereof. The video system 28 may be a known closed-circuit video system which displays video images on a portion of the display monitor 32. Alternatively, the video system 28 may be configured to include the hardware and software necessary to provide motion pattern recognition thereby providing security to the self-service checkout terminal 10 by monitoring the video images generated by the video system. In particular, the video system 28 may include a frame grabber (not shown) and a processing system (not shown) such as a personal computer (PC). The PC and the frame grabber are collectively referred to as a video processor. The video processor receives a standard video signal format, such as RS-170, NTSC, CCIR, or PAL, from the video camera 28a.

Video output signals from the video camera 28a are input to the frame grabber. The frame grabber operates to convert the analog video signals from the video camera 28a into a digital image which is stored within a memory for subsequent processing by the video processor. Once representations of the stream of digital images from the video camera 28a are sequentially stored in memory, the video processor may begin analyze or otherwise process the video image in order to monitor the manner in which the user handles items during operation of the self-service checkout terminal 10. For example, the video system 28 may be used to determine if the user moves an item in a manner indicative of an attempt to scan the item with the scanner 14. One video system 28 which is suitable for use in the present invention is disclosed in U.S. patent application Ser. No. 09/020,322 (NCR Docket No. 7408.10) entitled "Motion Pattern Recognition for a Self Checkout System" which was filed on Feb. 6, 1998, by Ralph Crabtree, which is incorporated herein by reference, and which is assigned to the same assignee as the present invention.

The processing unit 26 communicates with the display monitor 32 through a data communication line 43. The processing unit 26 generates output signals on the data communication line 43 which cause various instructional messages to be displayed on the display monitor 32. The display monitor 32 may include known touch screen technology which can generate output signals when the user touches a particular area of the display screen associated with the display monitor 32. The signals generated by the display monitor 32 are transmitted to the processing unit 26 via the data communication line 43. It should be appreciated that the various instructional messages may also be communicated via other devices in addition to or in lieu of the display monitor 32. For example, the instructional messages may be generated with a voice generating device (not shown) or an audible tone generating device (not shown).

The data input device 34 is coupled to the processing unit 26 through a data communication line 49. The data input device 34 may include one or more of a known keypad or a touch pad. In addition, the processing unit 26 is coupled to the printer 36 via a data communication line 47. The printer 36 may be used to print a receipt at the end of a given checkout procedure. Moreover, the card reader 30 is coupled to the processing unit through a data communication line 45. The card reader 30 may include a known credit and/or debit card reader, or a smart card reader.

The processing unit 26 includes network interface circuitry (not shown) which conventionally permits the self-service checkout terminal 10 to communicate with the network 25 such as a LAN or WAN through a wired connection 51. The processing unit 26 communicates with the network 25 during the checkout procedure in order to communicate with a paging system (not shown) or the like which pages or otherwise alerts the retailer's personnel as described further below. In addition, the processing unit 26 communicates with the network 25 to obtain information such as pricing information on an item being scanned or weighed, and also to verify user credit approval when appropriate. The network interface circuitry associated with the self-service checkout terminal 10 may include a known Ethernet expansion card, and the wired connection 51 may include a known twisted-pair communication line. Alternatively, the network interface circuitry may support wireless communications with the network 25.

The processing unit 26 communicates with the memory device 27 via a data communication line 53. The memory device 27 is provided to maintain an electronic transaction table which includes a record of the product information associated with each item that is scanned, weighed, or otherwise entered during the user's use of the self-service checkout terminal 10. For example, if the user scans a can of soup, the description of the soup and the pricing information associated therewith is recorded in the transaction table in the memory device 27. Similarly, if the user weighs a watermelon with the product scale 12 and then enters a product lookup code associated with watermelon via the data input device 34, product information associated with the watermelon is recorded in the transaction table. Moreover, if a user entered a coupon or voucher, the information associated therewith would also be recorded in the transaction table.

It should therefore be appreciated that the sum of each of the items recorded in the transaction table (1) minus any reductions (e.g. coupons), and (2) plus any applicable taxes is the amount that the user pays for his or her transaction. Moreover, data stored in the transaction table is printed out on the printer 36 thereby generating a receipt for the user at the end of his or her transaction.

The memory device 27 is also provided to maintain a number of electronic logs associated with operation of the self-service checkout terminal 10. More specifically, the memory device 27 electronically maintains a number of event logs each of which respectively tracks or otherwise tallies the number of occasions in which the user operates the self-service checkout terminal 10 in a particular manner. An event log may be provided to track those occasions in which the user unintentionally operated the self-service checkout terminal 10 improperly, along with those occasions in which it can be inferred with a high degree of confidence that the user intentionally operated the self-service checkout terminal 10 improperly for illicit purposes such as theft. For example, if the processing unit 26 determines that the user placed an item into the post-scan area 17 without having previously scanned or otherwise entered the item into the terminal 10, an entry is made in an event log corresponding to such activity. This is true since the user may have unintentionally operated the scanner 14 incorrectly thereby preventing the scanner 14 from reading the bar code printed on the item. However, the possibility does exist that the user may have intentionally prevented the scanner 14 from reading the bar code printed on the item (e.g. the user may have placed his or her thumb over the bar code during the scanning attempt). Therefore, an entry is made in an event log corresponding to such activity (i.e. placing an item in the post-scan area 17 without having first entered the item into the terminal 10).

Moreover, a separate event log may be maintained to track those occasions in which a user does not properly correct a prior misuse of the terminal 10. For example, if the processing unit 26 determines that the user placed an item into the post-scan area 17 without having previously scanned or otherwise entered the item into the terminal 10 in the manner discussed above, the processing unit 26 causes a message to be displayed on the display monitor 32 which instructs the user to remove the item from the post-scan area 17 and thereafter properly enter the item. A separate event log is maintained in order to track the number of occasions in which the user does not follow such instruction or performs an additional improper operation. For example, if subsequent to such instruction the user removes a different item, or no item at all, from the post-scan area 17, an entry is made into the event log associated with such activity.

Additional examples of event logs which may be maintained include an event log which tracks the number of occasions in which the user weighs an item, such as produce, with the product scale 12, but then places an item of a different weight in the post-scan area 17. Moreover, a separate event log may be provided to track the number of occasions in which a user voids a first item from his or her transaction, but then removes a second item of lesser value from the post-scan area 17. A separate event log may be maintained to track the dollar amount of the coupons which are entered by a given user. Yet further, a separate event log may be provided to track the amount of time which elapses from the point in time at which the user removes his or her items from the post-scan area 17 until the point in time at which the user tenders payment for his or her items.

Moreover, the memory device 27 maintains an electronic aggregate log. The aggregate log tracks the total of each of the various event logs. It should be appreciated that such an aggregate log is particularly useful for monitoring a user's "overall" operation of the self-service checkout terminal 10. In particular, while the occurrence of certain individual activities by a given user may not separately rise to a level of concern, the aggregate of such activities may be of concern to the retailer.

It should be appreciated that a separate, predetermined threshold value may be established for each of the numerous event logs and also the aggregate log. More specifically, a retailer may establish a threshold value for each of the logs that once equaled or exceeded causes the processing unit 26 to communicate with the network 25 in order to request intervention by store personnel. In particular, when a threshold value associated with one of the event logs or the aggregate log is equaled or exceeded, the processing unit 26 may communicate with the network 25 in order to page or otherwise alert the retailer's personnel as to certain events surrounding the operation of the self-service checkout terminal 10 by a given user. After being alerted in such a manner, the retailer's personnel will typically intervene into the user's transaction in order to either assist the user (in the case of inadvertent misuse of the terminal 10) or audit and/or discontinue the user's transaction (in the case of intentional misuse or theft). It should be appreciated that the processing unit 26 may communicate with the retailer's personnel via mechanisms other than a paging system associated with the network 25. For example, the self-service checkout terminal 10 may include a status light device (not shown) which displays a particular colored light when intervention by store personnel is needed. One status light device which is suitable for requesting intervention by store personnel is disclosed in copending U.S. patent application Ser. No. 08/998,210 entitled "Method for Displaying the Status of a Self-Service Checkout Terminal" which was filed on Dec. 24, 1997, by Dusty Lutz, the disclosure of which is hereby incorporated by reference, and is assigned to the same assignee as the present invention.

The memory device 27 further maintains a scale history table. The scale history table tracks previous usage of the post-scan scale 20. In particular, the scale history table tracks the two previous weight decreases (designated as $D_x$ and $D_y$, respectively) and the two previous weight increases (designated as $I_x$ and $I_y$, respectively) associated with the post-scan scale 20. As shall be discussed in more detail below, monitoring such previous weight decreases and increases enhances the security associated with operation of the self-service checkout terminal 10. An example of the scale history table is shown below in Table 1.

TABLE 1

| Scale Activity | Value of Decrease or Increase |
|---|---|
| First stored decrease value, $D_x$ | 14 ounces |
| Second stored decrease value, $D_y$ | 8½ ounces |
| First stored increase value, $I_x$ | 22½ ounces |
| Second stored increase value, $I_y$ | 4 ounces |

Figure 4:
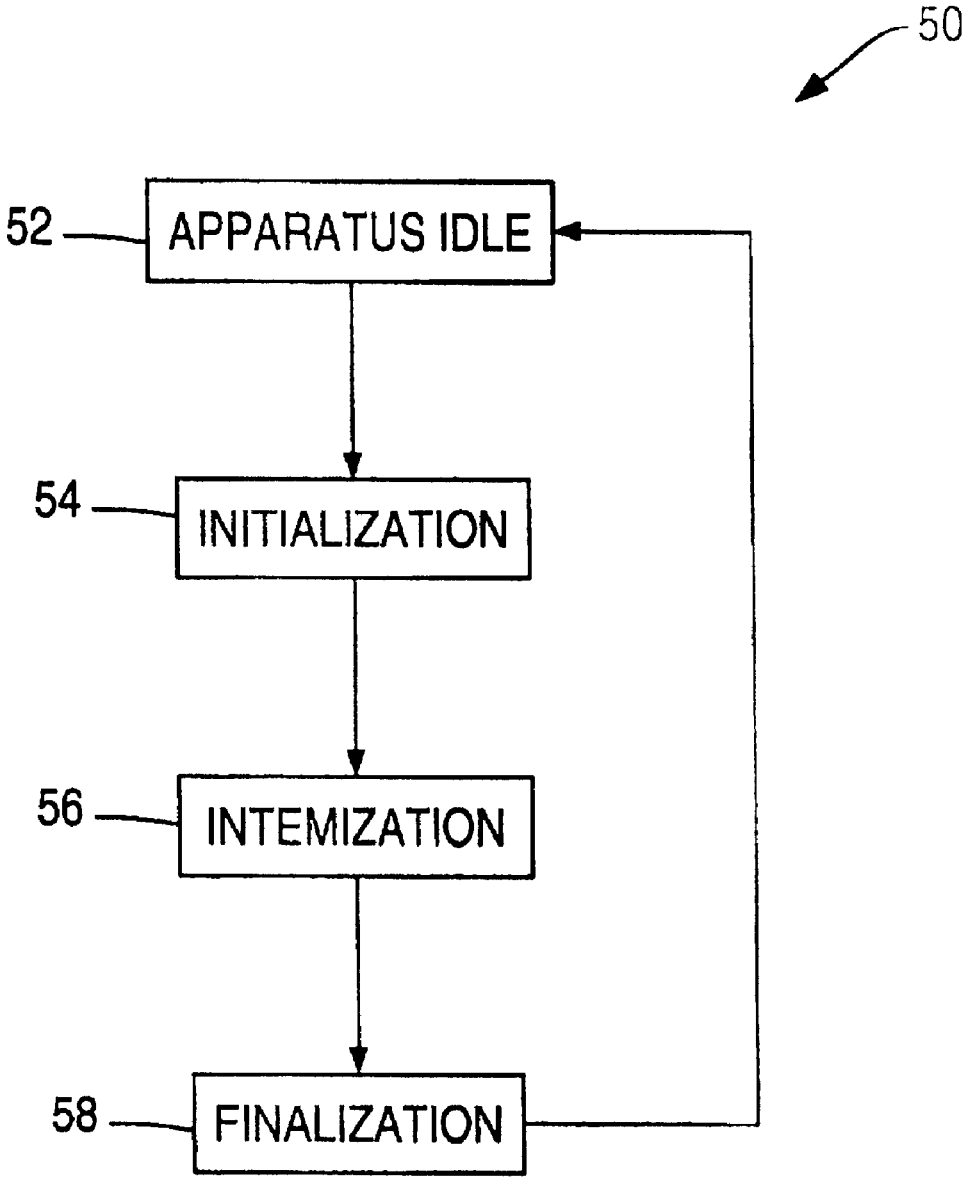
FIG. 4 is a flowchart setting forth a general procedure for checking out items through the self-service checkout terminal of FIG. 1.

Referring now to FIG. 4, there is shown a flowchart which set forth a general procedure 50 for checking out items through the self-service checkout terminal 10. When a user arrives at the self-service checkout terminal 10, the self-service checkout terminal 10 is in an idle state (step 52). An initialization step 54 is executed prior to checking out items for purchase. In particular, one or more initialization instructions are displayed on the display monitor 32 which instruct the user to (1) touch a particular area of the display monitor 32 or push a particular button on the data input device 34 in order to select a desired method of payment, and/or (2) identify himself or herself by inserting a shopping card, debit card, credit card, or smart card into the card reader 30.

At the completion of the initialization step 54, the routine 50 advances to an itemization step 56 where the user enters individual items for purchase by scanning the items across the scanner 14. Moreover, in step 56 the user enters items, such as produce items or the like, by weighing with the items with the product scale 12, and thereafter entering a product lookup code associated with the item via either the data input device 34 or by touching a particular area of the display monitor 32. Further, in step 56 the user may enter an item by manually entering the product code associated with the item via use of the data input device 34. Such manual entry of an item may be necessary for items which would otherwise be entered via the scanner 14 if the bar code printed on the item is not readable by the scanner 14. It may also be necessary during step 56 for the user to void entry of an item from the checkout procedure via use of the scanner 14 or the data input device 34. It should be appreciated that the self-service checkout terminal 10 may be configured such that the routine 50 allows experienced users of the self-service checkout terminal 10 to bypass the initialization step 52 thereby advancing directly to the itemization step 56. In such a configuration, the experienced user would begin the transaction by scanning or otherwise entering his or her first item for purchase.

At the completion of the itemization step 56, the routine 50 advances to a finalization step 58 in which (1) a grocery receipt is printed by the printer 36, and (2) payment is tendered by either inserting currency into a cash acceptor (not shown), charging a credit card account, or decreasing a value amount stored on a smart card or debit card via the card reader 30. It should be appreciated that in the case of when a user inserts currency into the cash acceptor, the self-service checkout terminal 10 may provide change via a currency dispenser (not shown) and a coin dispenser (not shown). After completion of the finalization step 58, the routine 50 returns to step 52 in which the self-service checkout terminal 10 remains in the idle condition until a subsequent user initiates a checkout procedure.

Figures 5, 5A, 5B, 5C:
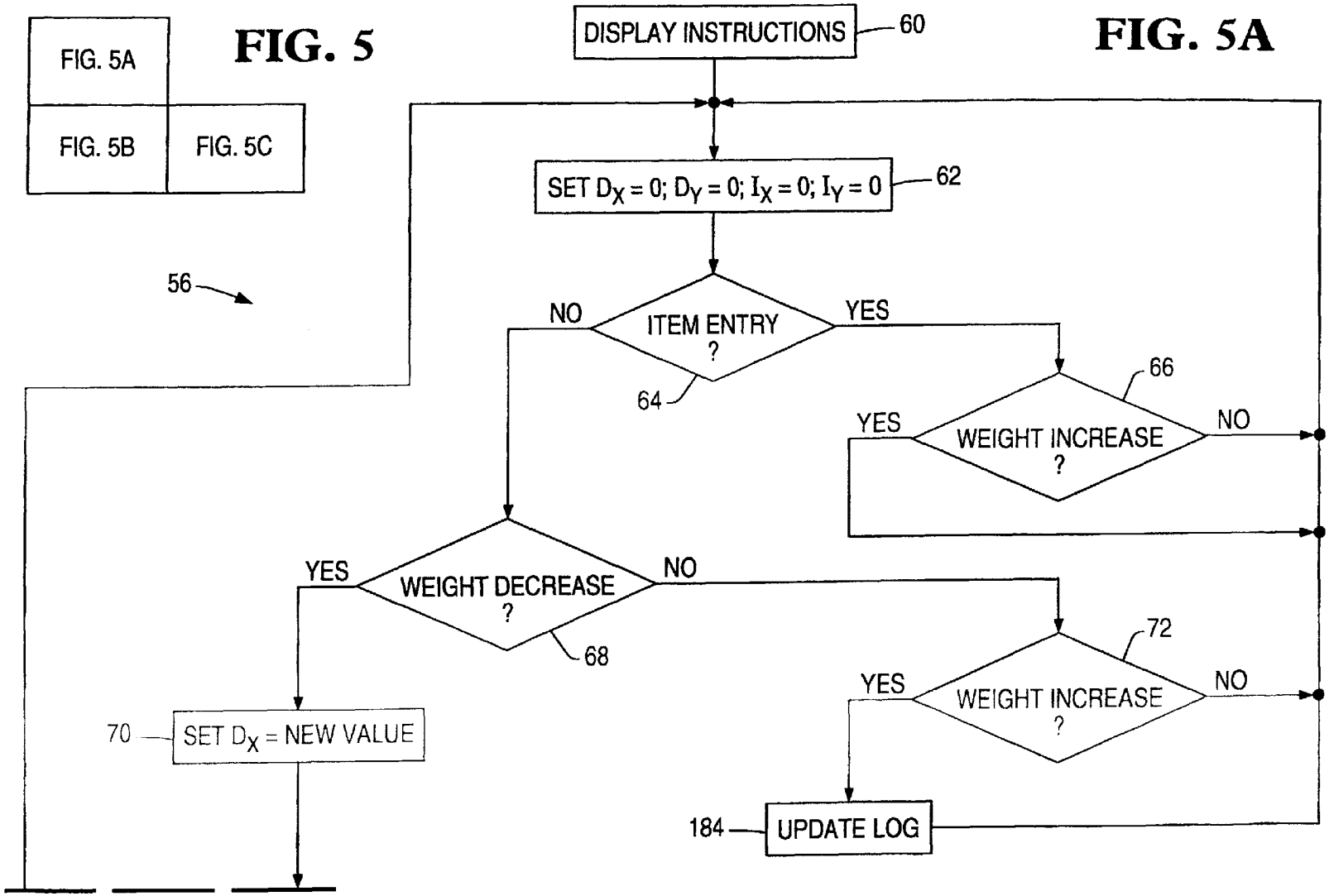
FIG. 5 is an illustration showing the arrangement of FIGS. 5A–5C.
FIGS. 5a–5c are a flowchart setting forth in more detail the itemization step of the general procedure of FIG. 4.
Figure 5B:
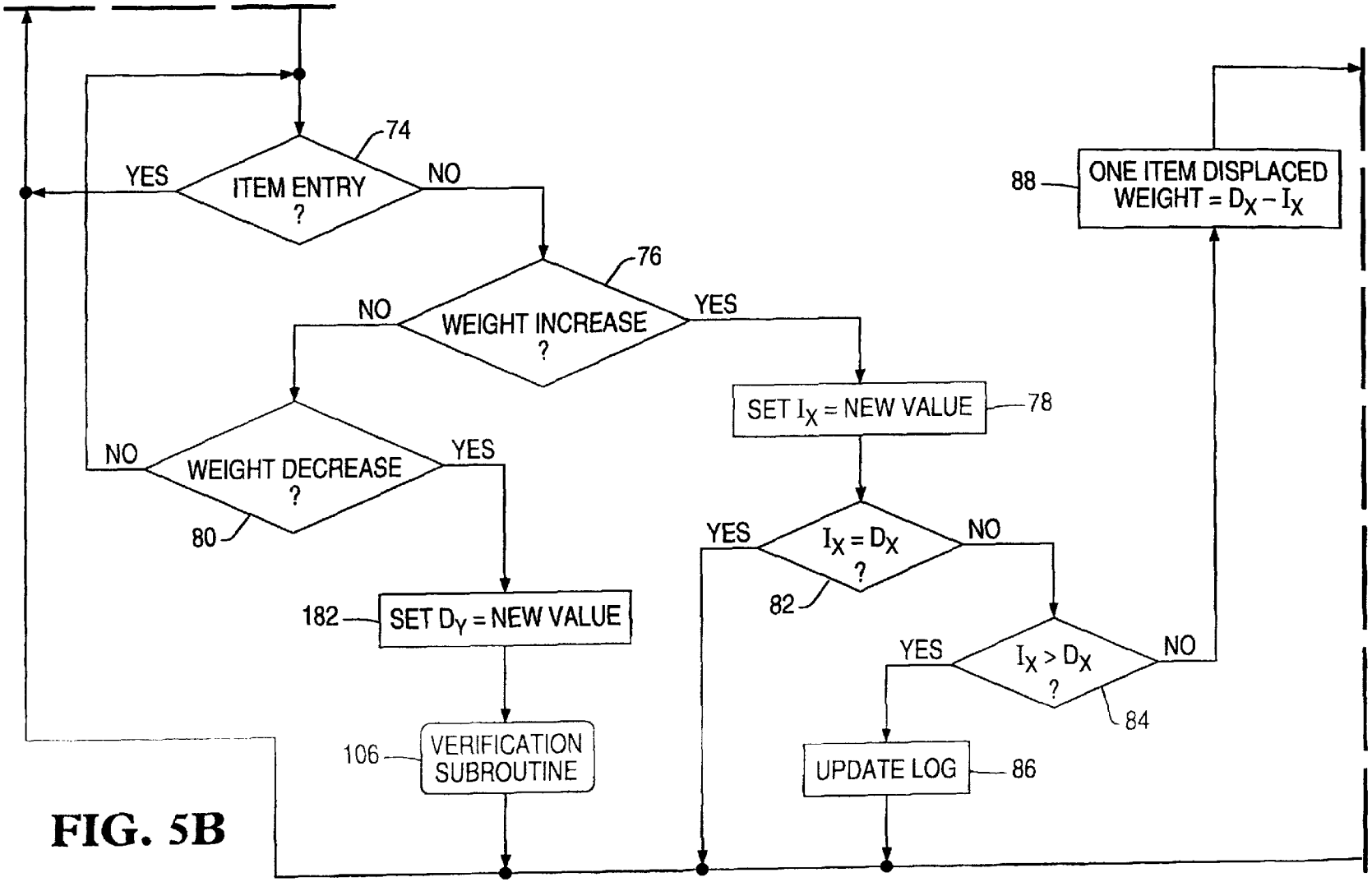
Figure 5C:
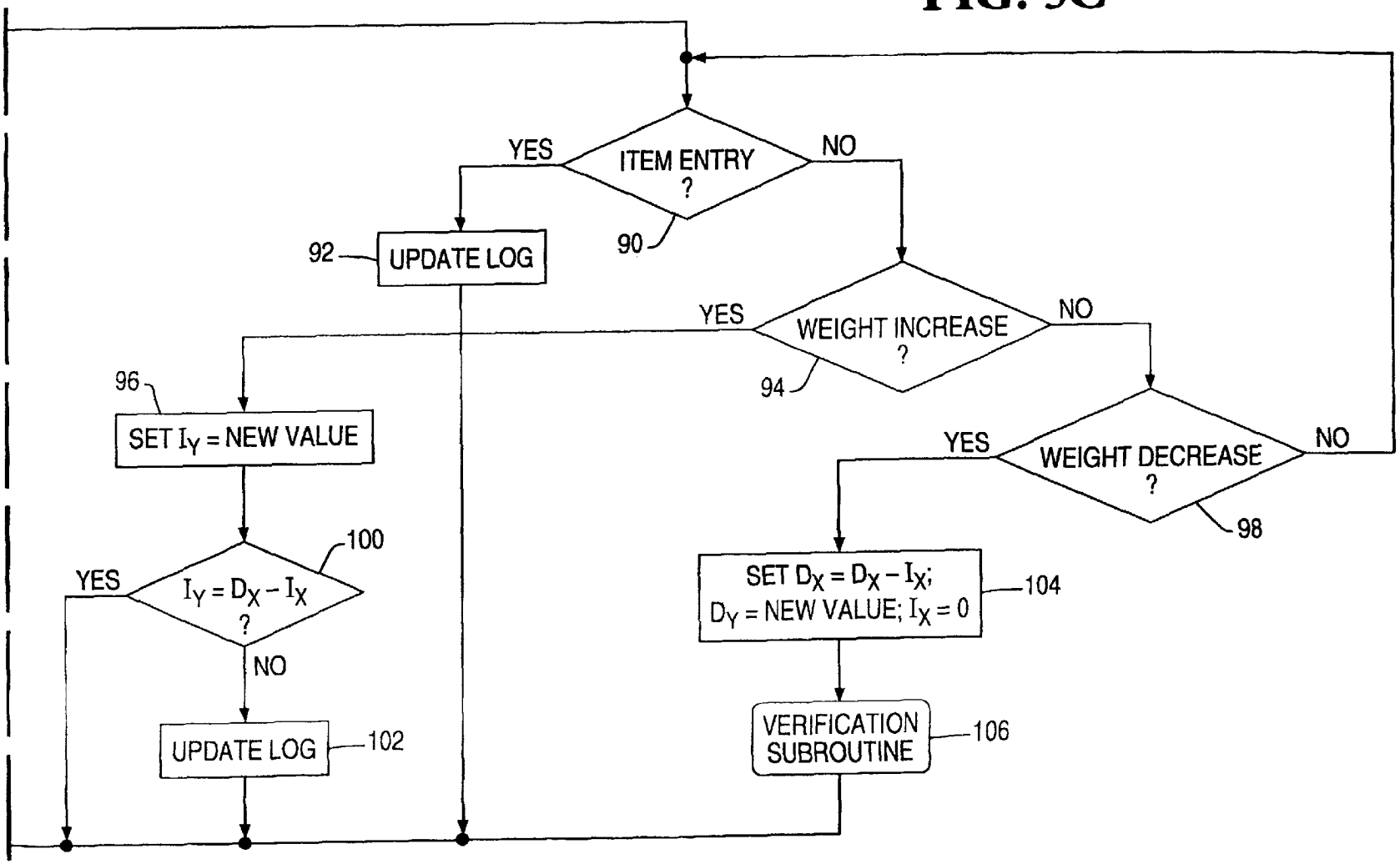

Referring now to FIG. 5, there is shown a flowchart setting forth the itemization step 56 in greater detail. After the initialization step 54 (see FIG. 4) is completed, the routine 56 advances to step 60 where a message is displayed on the display monitor 32 which instructs the user to enter an item by either (1) passing or otherwise scanning individual items across or adjacent the scanner 14 with the bar code containing the item's product identification code facing the scanning windows 14a, 14b, (2) placing an individual item on the product scale 12 in order to be weighed, or (3) manually entering the product identification code associated with an item with the data input device 34, or any combination thereof.

The routine 56 then advances to step 62 where the processing unit 26 clears the scale history table. In particular, the processing unit 26 generates an output signal which is sent to the memory device 27 which causes the scale history table to be updated in the memory device 27 such that each of $D_x$, $D_y$, $I_x$, and $I_y$ has a value of zero (0) associated therewith.

The routine 56 then advances to step 64 where the processing unit 26 scans or reads the data communication lines 29, 43, and 49 in order to determine whether an item has been entered in the self-service checkout terminal 10. What is meant herein by the terms "item entered" or "item entry" is that a code associated with an item is entered into the self-service checkout terminal 10 by either scanning the item with the scanner 14, weighing the item with the product scale 12, manually entering the product code associated with the item via either the touch screen portion of the display monitor 32 or the data input device 34, or any combination thereof. Hence in step 64, the processing unit 26 determines if (1) the scanner 14 has successfully read or otherwise captured the product identification code associated with an item, (2) the product identification code associated with an item has been entered via the touch screen portion of the display monitor 32, or (3) the product identification code associated with an item has been entered via the data input device 34. More specifically, the scanner 14 generates an output signal which is sent to the processing unit 26 once the scanner 14 successfully reads the product identification code associated with the item. Similarly, the display monitor 32 and/or the data input device 34 generates an output signal which is sent to the processing unit 26 once the product identification code has been entered by the user. If an item is successfully entered into the self-service checkout terminal 10, an item-entered control signal is generated and the routine 56 advances to step 66. If an item is not successfully entered into the self-service checkout terminal 10, the routine 56 advances to step 68.

In step 66, the processing unit 26 determines if the user placed the entered item into the post-scan area 17. In particular, the post-scan scale 20 generates an output signal indicative of the measured weight of the item which is sent to the processing unit 26 once the post-scan scale 20 detects the item being placed either (1) on the post-scan shelf 42b, or (2) into one of the grocery bags 40. It should be appreciated that the self-service checkout terminal 10 may be configured so as not to require the user to place an entered item into the post-scan area 17. For example, once the user has scanned or otherwise entered a pack of gum, the user may place the gum in his or her pocket in lieu of placing the gum into one of the grocery bags 40. Hence, in step 66, whether or not the user places the item into the post-scan area 17, the routine 56 returns to step 62.

Returning to step 64, if an item is not successfully entered into the self-service checkout terminal 10, the routine 56 advances to step 68. In step 68, the processing unit 26 determines if the user removed an item or items from the post-scan area 17. In particular, the post-scan scale 20 generates an output signal indicative of the measured weight of the item or items which is sent to the processing unit 26 once the post-scan scale 20 detects that an item or items has been removed from either (1) the post-scan shelf 42b, or (2) one of the grocery bags 40. It should be appreciated that if the post-scan scale 20 detects a weight decrease thereon, such a weight decrease may be indicative of the user removing a single item from the post-scan area 17, or alternatively, if the user removes an item with each hand, the detected weight decrease may be indicative of two items being removed from the post-scan area 17. If the post-scan scale 20 detects a weight decrease, the routine advances to step 70. If the post-scan scale 20 does not detect a weight decrease, the routine advances to step 72.

It should be appreciated that in step 68, the user may have removed the item or items from the post-scan area 17 in order to permanently remove the item or items from the self-service checkout terminal 10. For example, the user may have removed the item or items from the post-scan area 17 in order to place the item or items in a carryout cart or the like for the purpose of removing the item or items from the grocery store. Alternatively, the user may not have permanently removed the item or items from the post-scan area 17. In particular, the user may have removed an item or items from the post-scan shelf 42b for the purpose of thereafter placing the item or items into one of the grocery bags 40. For example, if the user had placed a loaf of bread on the post-scan shelf 42b after scanning the same, the user may have removed the bread from the post-scan shelf 42b in order to place the bread into one of the grocery bags 40 that is nearly full.

In step 70, the processing unit 26 updates the weight history table. More specifically, the processing unit 26 generates an output signal which is sent to the memory device 27 which causes the weight history table to be updated in the memory device 27 to set the value of $D_x$ to the value of the weight decrease detected by the post-scan scale 20 in step 68. For example, if the post-scan scale 20 detected a weight decrease of 22 ounces in step 68, the processing unit 26 causes the weight history table to be updated such that $D_x$=22 ounces.

The routine 56 then advances to step 74. Step 74 follows the same procedure outlined above with regard to step 64. In particular, the processing unit 26 scans or reads the data communication lines 29, 43, and 49 in order to determine whether an item has been entered in the self-service checkout terminal 10. If an item entry has occurred, the processing unit 26 concludes that the item or items were permanently removed from the post-scan area 17 in step 68 and the routine 56 returns to step 62. This is true since after having removed the item or items from the post-scan area 17 (as determined in step 68), the user would presumably be required to set the item or items down prior to scanning or otherwise entering a subsequent item. Hence, the processing unit 26 concludes the user permanently removed the item or items from the post-scan area 17, and the routine 56 returns to step 62. However, if an item entry has not occurred, the routine 56 advances to step 76.

In step 76, the processing unit 26 determines if the user placed an item or items into the post-scan area 17. In particular, the post-scan scale 20 generates an output signal indicative of the measured weight of the item or items which is sent to the processing unit 26 once the post-scan scale 20 detects a weight increase associated with an item or items being placed either (1) on the post-scan shelf 42b, or (2) into one of the grocery bags 40. If a weight increase is detected by the post-scan scale 20, the routine 56 advances to step 78. If the post-scan scale 20 does not detect a weight increase, the routine advances to step 80.

In step 78, the processing unit 26 updates the weight history table. More specifically, the processing unit 26 generates an output signal which is sent to the memory device 27 which causes the weight history table to be updated in the memory device 27 to set the value of $I_x$ to the value of the weight increase detected by the post-scan scale 20 in step 76. For example, if the post-scan scale 20 detected a weight decrease of 12 ounces in step 76, the processing unit 26 causes the weight history table to be updated such that $I_x$=12 ounces. The routine 56 then advances to step 82.

In step 82, the processing unit 26 determines if the weight of the item or items that were placed in the post-scan area 17 (as detected in step 76) matches the weight of the item or items that were removed from the post-scan area 17 (as detected in step 68). What is meant herein by the terms "match", "matches", or "matching" is that the magnitude of a first weight value is either equal to, or within a predetermined tolerance range of, the magnitude of a second weight value. Hence in step 82, the processing unit 26 looks up the stored values of $I_x$ and $D_x$ from the weight history table and thereafter compares the values thereof. If the value of $I_x$ matches the value of $D_x$, the processing unit 26 concludes that the item or items that were placed in the post-scan area 17 (as detected in step 76) are the same item or items which were removed from the post-scan area 17 (as detected in step 68). It should be appreciated that such a match of weight values is caused by the "shuffling" of items within the post-scan area 17. For example, the user may have removed a loaf of bread from the post-scan shelf 42b and thereafter placed the bread into one of the grocery bags 40 thereby causing the weight value removed from the post-scan area 17 (i.e. the weight of the bread) to match the weight value placed in the post-scan area 17 (i.e. the weight of the bread). Moreover, matching weight values would also be detected if the user moved an item from one location on the post-scan shelf 42b to a different location on the post-scan shelf 42b. Hence, in step 82, if the value of $I_x$ matches the value of $D_x$, the processing unit 26 concludes that the item or items that were placed in the post-scan area 17 are the same item or items which were removed from the post-scan area 17 thereby indicating that a proper item shuffle has occurred within the post-scan area 17. Thereafter, a match control signal is generated and the routine 56 returns to step 62. However, if the value of $I_x$ does not match the value of $D_x$, the routine 56 advances to step 84.

In step 84, the processing unit 26 determines if the value of $I_x$ is greater than the value of $D_x$. If the value of $I_x$ is greater than the value of $D_x$, the processing unit 26 concludes that an item or items has improperly been added to the post-scan area 17. This is true since the weight of the item or items which were placed in the post-scan area 17 (as detected in step 76) were greater than the weight of the item or items that were removed from the post-scan area 17 thereby indicating that additional and/or different items were placed in the post-scan area 17. Hence, an improper-use control signal is generated and the routine 56 advances to step 86. However, if the value of $I_x$ is less than the value of $D_x$ (and not equal to $D_x$ as determined in step 82), the routine advances to step 88.

In step 86, the processing unit 26 increments the appropriate event logs and the aggregate log by a predetermined value. In particular, the processing unit 26 generates an output signal which is sent to the memory device 27 which causes the appropriate event logs and the aggregate log to be incremented in the memory device 27 by a predetermined value. Thereafter, the processing unit 26 compares the various event logs and the aggregate log to their respective threshold values in order to determine if any of the event logs have a predetermined relationship therewith. In particular, if the respective value of any of the event logs and/or the aggregate log equals or exceeds its respective threshold value, an intervention control signal is generated and appropriate store personnel is paged or otherwise summoned to intervene in the user's transaction. If after such intervention the user's transaction is permitted to continue, the routine 56 returns to step 62. It should be appreciated that store personnel may not allow the user's transaction to continue (e.g. if it is determined that the user intentionally operated the terminal 10 improperly to commit an impropriety such as theft) thereby causing the routine 56 to end which in turn causes the routine 50 (see FIG. 4) to return to step 52 in which the self-service checkout terminal 10 will remain idle until initialized by a subsequent user.

Returning now to step 84, if the value of $I_x$ is less than the value of $D_x$ (and not equal to $D_x$ as determined in step 82), the routine 56 advances to step 88. In step 88, the processing unit 26 concludes that only one item remains displaced or otherwise removed from the post-scan area 17. Moreover, the processing unit 26 concludes that the displaced item has a weight of $D_x$–$I_x$. This is true since apparently the user removed two items having a combined weight value of $D_x$ from the post-scan area 17 and thereafter placed one item having a weight value of $I_x$ in the post-scan area 17 thereby leaving the second item (having a weight value of $D_x$–$I_x$) in the user's hands. Hence, an item-displaced control signal is generated and the routine 56 advances to step 90.

Step 90 follows the same procedure outlined above with regard to step 64. In particular, the processing unit 26 scans or reads the data communication lines 29, 43, and 49 in order to determine whether an item has been entered in the self-service checkout terminal 10. If an item entry has occurred, the processing unit 26 concludes the second or remaining item that was displaced or otherwise removed from the post-scan area 17 (as detected in step 68) has not yet been returned to the post-scan area 17 prior to entry of a subsequent item. Moreover, the possibility does exist that the item that was placed in the post-scan area 17 (as detected in step 76) was not actually one of the items which was removed from the post-scan area 17 (as detected in step 68). Hence, if an item entry has occurred, an improper-use control signal is generated and the routine 56 advances to returns to step 92. However, if an item entry has not occurred, the routine 56 advances to step 94.

In step 92, the processing unit 26 increments the appropriate event logs and the aggregate log by a predetermined value. In particular, the processing unit 26 generates an output signal which is sent to the memory device 27 which causes the appropriate event logs and the aggregate log to be incremented in the memory device 27 by a predetermined value. Thereafter, the processing unit 26 compares the various event logs and the aggregate log to their respective threshold values in order to determine if any of the event logs have a predetermined relationship therewith. In particular, if the respective value of any of the event logs and/or the aggregate log equals or exceeds its respective threshold value, an intervention control signal is generated and appropriate store personnel is paged or otherwise summoned to intervene in the user's transaction. If after such intervention the user's transaction is permitted to continue, the routine 56 returns to step 62. It should be appreciated that store personnel may not allow the user's transaction to continue (e.g. if it is determined that the user intentionally operated the terminal 10 improperly to commit an impropriety such as theft) thereby causing the routine 56 to end which in turn causes the routine 50 (see FIG. 4) to return to step 52 in which the self-service checkout terminal 10 will remain idle until initialized by a subsequent user.

Returning now to step 90, if an item entry has not occurred, the routine 56 advances to step 94. Step 94 follows the same procedure outlined above in regard to step 76. In particular, the processing unit 26 determines if the user placed an item or items into the post-scan area 17. More specifically, the post-scan scale 20 generates an output signal indicative of the measured weight of the item which is sent to the processing unit 26 once the post-scan scale 20 detects a weight increase associated with an item or items being placed either (1) on the post-scan shelf 42b, or (2) into one of the grocery bags 40. If a weight increase is detected by the post-scan scale 20, the routine 56 advances to step 96. If the post-scan scale 20 does not detect a weight increase, the routine 56 advances to step 98.

In step 96, the processing unit 26 updates the weight history table. More specifically, the processing unit 26 generates an output signal which is sent to the memory device 27 which causes the weight history table to be updated in the memory device 27 to set the value of $I_y$ to the value of the weight increase detected by the post-scan scale 20 in step 94. For example, if the post-scan scale 20 detected a weight increase of 8½ ounces in step 94, the processing unit 26 causes the weight history table to be updated such that $I_y$=8½ ounces. The routine 56 then advances to step 100.

In step 100, the processing unit 26 determines if the sum of the weights of the items placed in the post-scan area 17 (as detected in steps 76 and 94) matches the weight of the items that were removed from the post-scan area 17 (as detected in step 68). In particular, the processing unit 26 looks up the stored values of $I_x$, $I_y$, and $D_x$ from the weight history table and thereafter compares the value thereof. If the value of $I_y$ matches the value of $D_x=I_x$ (e.g. if $D_x=I_x+I_y$), the processing unit 26 concludes that the items that were placed in the post-scan area 17 (as detected in steps 76 and 94) are the same items which were removed from the post-scan area 17 (as detected in step 68). It should be appreciated that such a match of weight values is caused by the shuffling of items within the post-scan area 17. For example, the user may have removed a loaf of bread and a bag of chips from the post-scan shelf 42b and thereafter placed the bread and the chips into one of the nearly full grocery bags 40 thereby causing the weight value removed from the post-scan area 17 (i.e. the weight of the bread and the chips) to match the weight value placed in the post-scan area 17 (i.e. the weight of the bread and the chips). Moreover, matching weight values would also be detected if the user moved items from one location on the post-scan shelf 42b to a different location on the post-scan shelf 42b. Hence, in step 100, if the value of $I_y$ matches the value of $D_x-I_x$, the processing unit 26 concludes that the items that were placed in the post-scan area 17 are the same items which were removed from the post-scan area 17 thereby indicating that a proper item shuffle has occurred within the post-scan area 17. Thereafter, a match control signal is generated and the routine 56 returns to step 62. However, if the value of $I_y$ does not match the value of $D_x-I_x$, an improper-use control signal is generated and the routine 56 advances to step 102.

In step 102, the processing unit 26 increments the appropriate event logs and the aggregate log by a predetermined value. In particular, the processing unit 26 generates an output signal which is sent to the memory device 27 which causes the appropriate event logs and the aggregate log to be incremented in the memory device 27 by a predetermined value. Thereafter, the processing unit 26 compares the various event logs and the aggregate log to their respective threshold values in order to determine if any of the event logs have a predetermined relationship therewith. In particular, if the respective value of any of the event logs and/or the aggregate log equals or exceeds its respective threshold value, an intervention control signal is generated and appropriate store personnel is paged or otherwise summoned to intervene in the user's transaction. If after such intervention the user's transaction is permitted to continue, the routine 56 returns to step 62. It should be appreciated that store personnel may not allow the user's transaction to continue (e.g. if it is determined that the user intentionally operated the terminal 10 improperly to commit an impropriety such as theft) thereby causing the routine 56 to end which in turn causes the routine 50 (see FIG. 4) to return to step 52 in which the self-service checkout terminal 10 will remain idle until initialized by a subsequent user.

Returning now to step 94, if a weight increase is not detected by the post-scan scale 20, the routine 56 advances to step 98. Step 98 follows the same procedure outlined above in regard to step 68. In particular, the processing unit 26 determines if the user removed an item or items from the post-scan area 17. More specifically, the post-scan scale 20 generates an output signal indicative of the measured weight of the item or items which is sent to the processing unit 26 once the post-scan scale 20 detects that an item or items has been removed from either (1) the post-scan shelf 42b, or (2) one of the grocery bags 40. It should be appreciated that if the post-scan scale 20 detects a weight decrease thereon, such a weight decrease may be indicative of the user removing a single item from the post-scan area 17, or alternatively, if the user removes an item with each hand, the detected weight decrease may be indicative of two items being removed from the post-scan area 17. If the post-scan scale 20 detects a weight decrease, the routine 56 advances to step 104. If the post-scan scale 20 does not detect a weight decrease, the routine 56 loops back to step 90.

In step 104, the processing unit 26 updates the weight history table. More specifically, the processing unit 26 generates an output signal which is sent to the memory device 27 which causes the weight history table to be updated in the memory device 27 to (1) set the value of $D_x$ to the existing value of $D_x$ minus the value of $I_x$ (as detected in step 76), (2) set the value of $D_y$ to the value of the weight decrease detected by the post-scan scale 20 in step 98, and (3) set the value of $I_x$ to zero (0). For example, if the post-scan scale 20 detected a weight decrease of 10 ounces in step 68, a weight increase of 8 ounces in step 76, and a weight decrease of 14 ounces in step 98, the processing unit 26 causes the weight history table to be updated such that $D_x$=2 ounces, $D_y$=14 ounces, and $I_x$=0. The routine 56 then advances to a verification subroutine 106.

Figures 6, 6A, 6B, 6C, 6D:
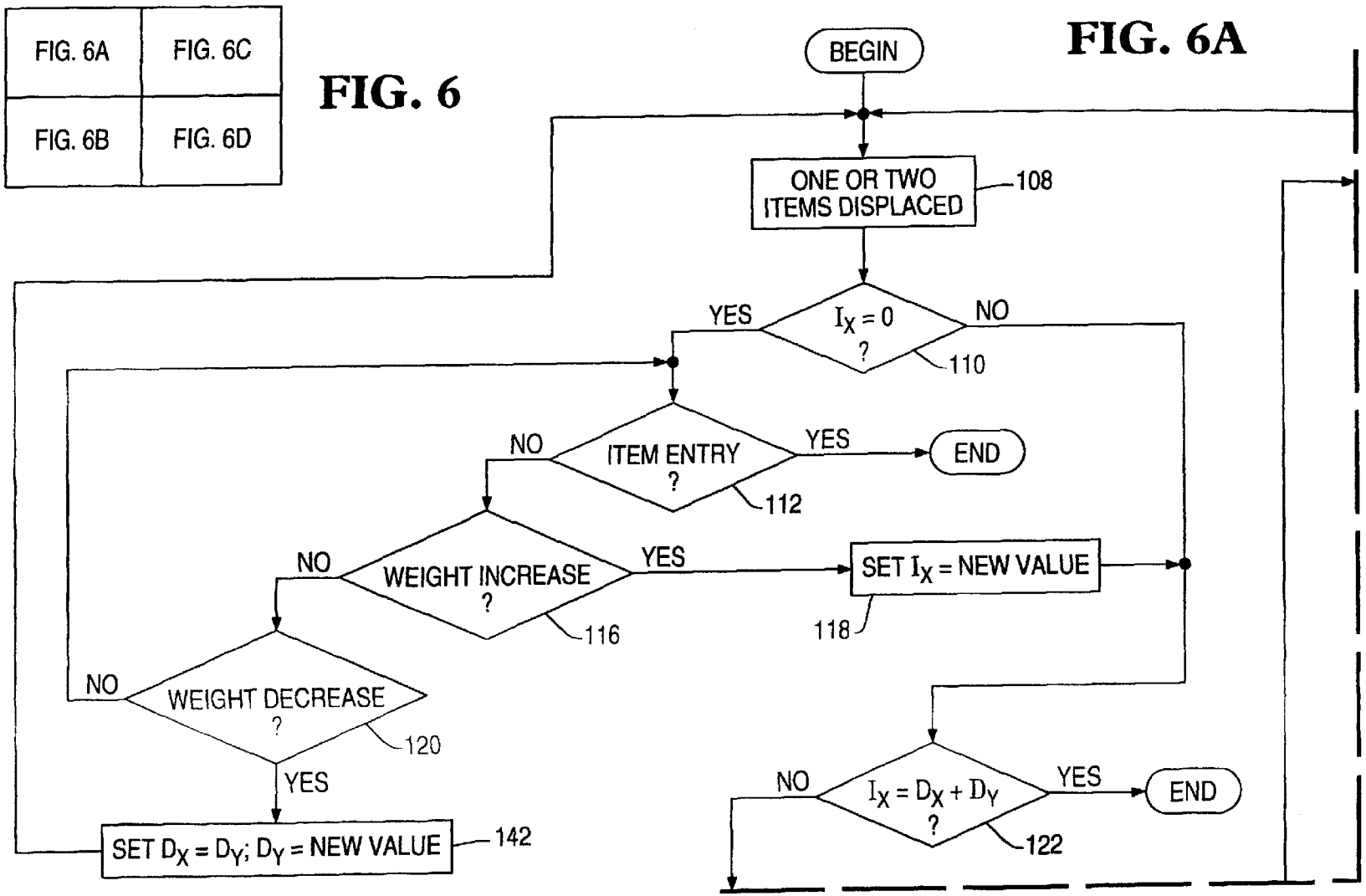
FIG. 6 is an illustration showing the arrangement of FIGS. 6A–6D.
FIGS. 6a–6d are a flowchart setting forth in detail the verification subroutine of the itemization step of FIG. 5.
Figure 6B:
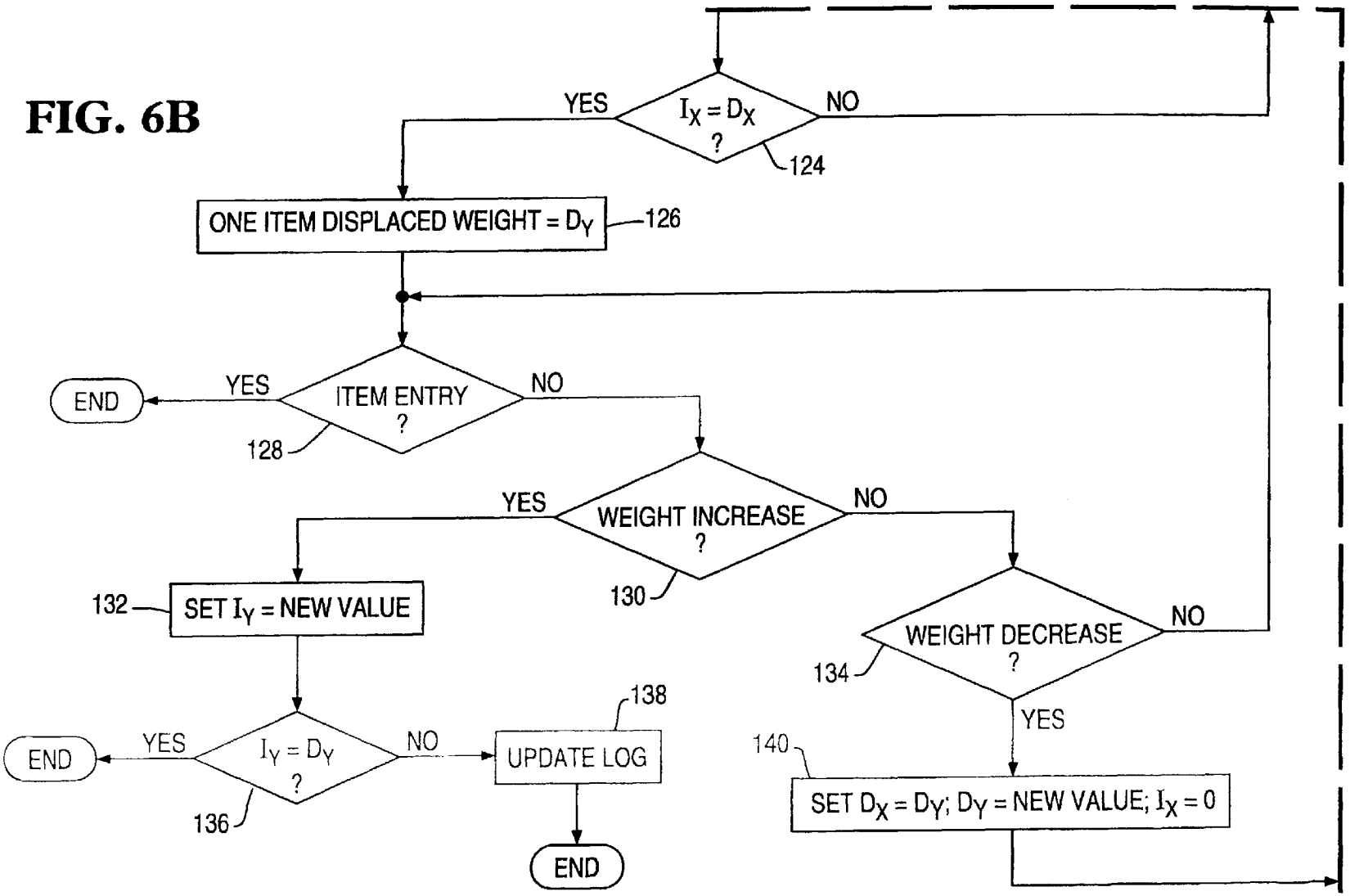
Figure 6C:
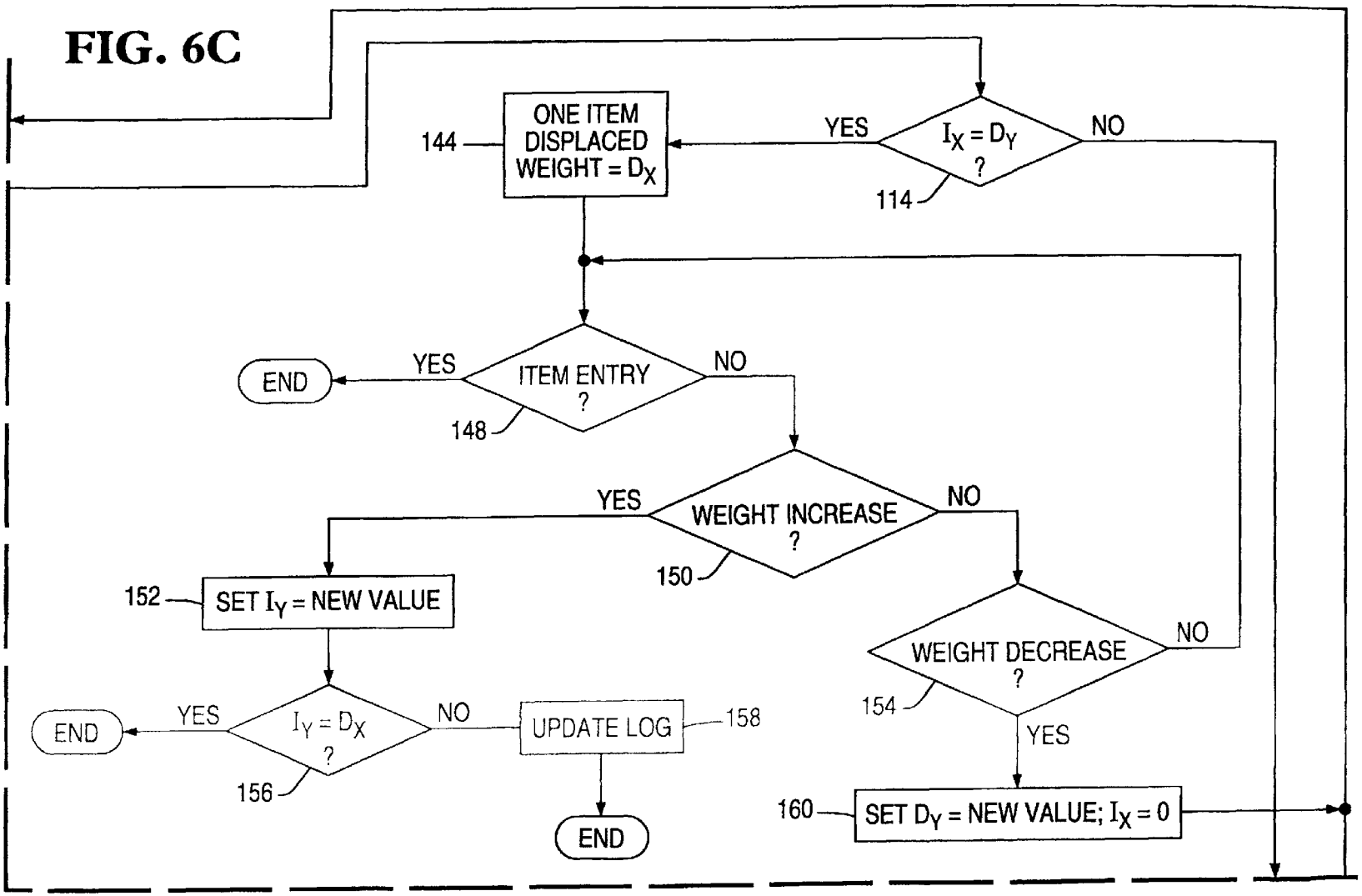
Figure 6D:
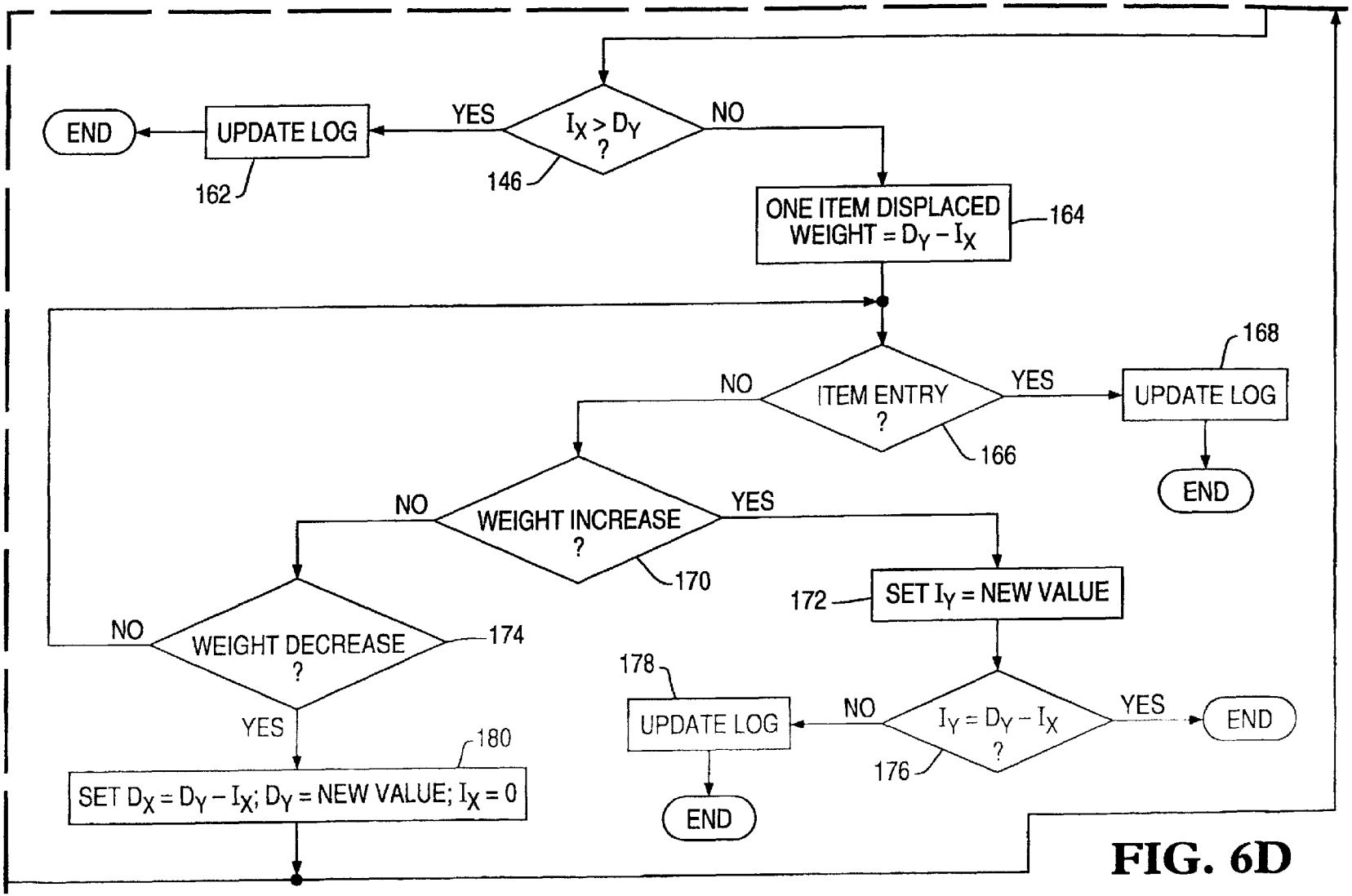

Referring now to FIG. 6, the verification subroutine 106 is shown in more detail. The subroutine 106 begins with step 108 in which the processing unit 26 concludes that either one or two items have been displaced or otherwise removed from the post-scan area 17. This is true since the weight history table includes a non-zero value for both $D_x$ and $D_y$. It should be appreciated that such a non-zero value for both $D_x$ and $D_y$ may be the result of a number of scenarios. Firstly, the item or items associated with the stored weight decrease value $D_x$ may have been permanently removed from the post-scan area 17 (e.g. placed in a carryout cart for removal from the grocery store) thereby causing only the item or items associated with the stored weight decrease value $D_y$ to be in question. As discussed above, any given weight decrease may be the result of only a single item being removed from the post-scan area 17, or may be the result of two items (one in each of the user's hand) being simultaneously removed from the post-scan area 17. Hence, if the item or items associated with the stored weight decrease value $D_x$ have been permanently removed the post-scan area 17 (e.g. placed in a carryout cart for removal from the grocery store), a single item (having a weight value of $D_y$) may be displaced from the post-scan area 17 or two items (the combined or sum weight of which has a weight value of $D_y$) may be displaced from the post-scan area 17. Alternatively, if an item associated with the stored weight decrease value $D_x$ has not been permanently removed the post-scan area 17 (e.g. remains in one of the user's hands), two items (one having a weight value of $D_x$, the other having a weight value of $D_y$) are displaced from the post-scan area 17. Moreover, if an item associated with the stored weight decrease value $D_y$ has been permanently removed from the post-scan area 17 (e.g. placed in a carryout cart for removal from the grocery store), one item (having a weight value of $D_x$) is displaced from the post-scan area 17.

The routine then advances to step 110 in which the processing unit 26 determines if an unaccounted for item or items have previously been placed in the post-scan area 17. In particular, the processing unit 26 communicates with the memory device 27 to look up the stored value of $I_x$ from the weight history table. If the value of $I_x$ equals zero (0), the processing unit 26 concludes that no unaccounted for item or items have been placed in the post-scan area 17 and the subroutine 106 advances to step 112. If the value of $I_x$ does not equal zero (0), the subroutine 106 advances to step 122.

Step 112 follows the same procedure outlined above with regard to step 64. In particular, the processing unit 26 scans or reads the data communication lines 29, 43, and 49 in order to determine whether an item has been entered in the self-service checkout terminal 10. If an item entry has occurred, the processing unit 26 concludes that the item or items associated with the previous weight decreases ($D_x$ and $D_y$) were permanently removed from the post-scan area 17 (e.g. placed in a carryout cart for removal from the grocery store) thereby causing the subroutine 106 to end which in turn causes the itemization routine 56 to return to step 62 (see FIG. 5). This is true since after having removed the item or items from the post-scan area 17, the user would presumably be required to set the item or items down prior to scanning or otherwise entering a subsequent item. Hence, the processing unit 26 concludes the user permanently removed the item or items from the post-scan area 17. However, if an item entry has not occurred, the subroutine 106 advances to step 116.

Step 116 follows the same procedure outlined above in regard to step 76. In particular, the processing unit 26 determines if the user placed an item or items into the post-scan area 17. More specifically, the post-scan scale 20 generates an output signal indicative of the measured weight of the item or items which is sent to the processing unit 26 once the post-scan scale 20 detects a weight increase associated with an item or items being placed either (1) on the post-scan shelf 42b, or (2) into one of the grocery bags 40. If a weight increase is detected by the post-scan scale 20, the subroutine 106 advances to step 118. If the post-scan scale 20 does not detect a weight increase, the subroutine 106 advances to step 120.

In step 118, the processing unit 26 updates the weight history table. More specifically, the processing unit 26 generates an output signal which is sent to the memory device 27 which causes the weight history table to be updated in the memory device 27 to set the value of $I_x$ to the value of the weight increase detected by the post-scan scale 20 in step 116. For example, if the post-scan scale 20 detected a weight increase of 8½ ounces in step 116, the processing unit 26 causes the weight history table to be updated such that $I_x$=8½ ounces. The subroutine 106 then advances to step 122.

In step 122, the processing unit 26 determines if the weight of the item or items placed in the post-scan area 17 (having a weight value of $I_x$) matches the total weight of the items that were removed from the post-scan area 17 during the previous two detected weight decreases (having a sum weight value of $D_x$+$D_y$). In particular, the processing unit 26 looks up the stored values of $I_x$, $D_x$, and $D_y$ from the weight history table and thereafter compares the values thereof. If the value of $I_x$ matches the value of $D_x$+$D_y$ (e.g. if $I_x$=$D_x$+$D_y$), the processing unit 26 concludes (1) that two items were previously displaced from the post-scan area 17, (2) one of the items has a weight of $D_x$, whereas the other item has weight of $D_y$, and (3) both items have been returned to the post-scan area 17. Thereafter, a match control signal is generated and the subroutine 106 then ends thereby causing the itemization routine 56 to return to step 62 (see FIG. 5). However, if the value of $I_x$ does not match the value of $D_x$+$D_y$, the subroutine 106 advances to step 124.

In step 124, the processing unit 26 determines if the previously detected weight increase (having a weight value of $I_x$) was the result of single item (having a weight value of $D_x$) being returned to the post-scan area 17. In particular, the processing unit 26 compares the weight value $I_x$ to the weight value $D_x$. If the weight value $I_x$ matches the weight value $D_x$, the subroutine advances to step 126. If the weight value $I_x$ does not match the weight value $D_x$, the subroutine advances to step 114.

In step 126, the processing unit 26 concludes that only one item (having a weight value of $D_y$) remains displaced or otherwise removed from the post-scan area 17. This is true since apparently two items were displaced from the post-scan area 17, one of which (having a weight of $D_x$) was returned to the post-scan area 17 thereby leaving only the item associated with the weight value $D_y$ unaccounted for. As discussed above, the user presumably maintains no more than two items at a given time (one item in each hand). Hence, if one item had a weight value of $D_x$, it can be inferred that the second item has a weight value of $D_y$. A displaced item control signal is generated and the routine then advances to step 128.

Step 128 follows the same procedure outlined above with regard to step 74. In particular, the processing unit 26 scans or reads the data communication lines 29, 43, and 49 in order to determine whether an item has been entered in the self-service checkout terminal 10. If an item entry has occurred, the processing unit 26 concludes that the unaccounted item associated with the previous weight decrease (having a weight value of $D_y$) was permanently removed from the post-scan area 17 (e.g. placed in a carryout cart for removal from the grocery store) thereby causing the sub-routine 106 to end which in turn causes the itemization routine 56 to return to step 62 (see FIG. 5). This is true since after having removed the item from the post-scan area 17, the user would presumably be required to set the item down prior to scanning or otherwise entering a subsequent item. Hence, the processing unit 26 concludes the user permanently removed the item from the post-scan area 17. However, if an item entry has not occurred, the subroutine 106 advances to step 130.

Step 130 follows the same procedure outlined above with regard to step 76. In particular, the processing unit 26 determines if the user placed an item or items into the post-scan area 17. More specifically, the post-scan scale 20 generates an output signal indicative of the measured weight of the item or items which is sent to the processing unit 26 once the post-scan scale 20 detects a weight increase associated with an item or items being placed either (1) on the post-scan shelf 42b, or (2) into one of the grocery bags 40. If a weight increase is detected by the post-scan scale 20, the subroutine 106 advances to step 132. If the post-scan scale 20 does not detect a weight increase, the subroutine 106 advances to step 134.

In step 132, the processing unit 26 updates the weight history table. More specifically, the processing unit 26 generates an output signal which is sent to the memory device 27 which causes the weight history table to be updated in the memory device 27 to set the value of $I_y$ to the value of the weight increase detected by the post-scan scale 20 in step 130. For example, if the post-scan scale 20 detected a weight increase of 14 ounces in step 130, the processing unit 26 causes the weight history table to be updated such that $I_y$=14 ounces. The subroutine 106 then advances to step 136.

In step 136, the processing unit 26 determines if the weight of the item or items placed in the post-scan area 17 (as detected in step 130) matches the weight of the item that was removed from the post-scan area 17 during the previously detected weight decrease (having a weight value of $D_y$). In particular, the processing unit 26 looks up the stored values of $I_y$ and $D_y$ from the weight history table and thereafter compares the values thereof. If the value of $I_y$ matches the value of $D_y$, the processing unit 26 concludes that the item previously displaced from the post-scan area 17 (having a weight value of $D_y$) has been returned to the post-scan area 17 (as detected in step 130). A match control signal is generated an the subroutine 106 then ends thereby causing the itemization routine 56 to return to step 62 (see FIG. 5). However, if the value of $I_y$ does not match the value of $D_y$, the processing unit 26 concludes that an item not previously removed from the post-scan area 17 was placed in the post-scan area 17 in step 116. An improper-use control signal is generated and the subroutine 106 then advances to step 138.

In step 138, the processing unit 26 increments the appropriate event logs and the aggregate log by a predetermined value. In particular, the processing unit 26 generates an output signal which is sent to the memory device 27 which causes the appropriate event logs and the aggregate log to be incremented in the memory device 27 by a predetermined value. Thereafter, the processing unit 26 compares the various event logs and the aggregate log to their respective threshold values in order to determine if any of the event logs have a predetermined relationship therewith. In particular, if the respective value of any of the event logs and/or the aggregate log equals or exceeds its respective threshold value, an intervention control signal is generated and appropriate store personnel is paged or otherwise summoned to intervene in the user's transaction. If after such intervention the user's transaction is permitted to continue, the subroutine 106 then ends thereby causing the itemization routine 56 to return to step 62 (see FIG. 5). It should be appreciated that store personnel may not allow the user's transaction to continue (e.g. if it is determined that the user intentionally operated the terminal 10 improperly to commit an impropriety such as theft) thereby causing the both the subroutine 106 and the itemization routine 56 to end which in turn causes the routine 50 (see FIG. 4) to return to step 52 in which the self-service checkout terminal 10 will remain idle until initialized by a subsequent user.

Returning to step 130, if the post-scan scale 20 does not detect a weight increase, the subroutine 106 advances to step 134. Step 134 follows the same procedure outlined above in regard to step 68. In particular, the processing unit 26 determines if the user removed an item or items from the post-scan area 17. More specifically, the post-scan scale 20 generates an output signal indicative of the measured weight of the item or items which is sent to the processing unit 26 once the post-scan scale 20 detects that an item or items has been removed from either (1) the post-scan shelf 42b, or (2) one of the grocery bags 40. It should be appreciated that if the post-scan scale 20 detects a weight decrease thereon, such a weight decrease may be indicative of the user removing a single item from the post-scan area 17, or alternatively, if the user removes an item with each hand, the detected weight decrease may be indicative of two items being removed from the post-scan area 17. If the post-scan scale 20 detects a weight decrease, the subroutine 106 advances to step 140. If the post-scan scale 20 does not detect a weight decrease, the subroutine 106 loops back to step 128.

In step 140, the processing unit 26 updates the weight history table. More specifically, the processing unit 26 generates an output signal which is sent to the memory device 27 which causes the weight history table to be updated in the memory device 27 to (1) set the value of $D_x$ to the existing value of $D_y$, (2) set the value of $D_y$ to the value of the weight decrease detected by the post-scan scale 20 in step 134, and (3) set the value of $I_x$ to zero (0). For example, if prior to detecting a weight decrease of 10 ounces in step 134, the stored weight values of $D_x$ and $D_y$ were 8½ ounces and 13 ounces, respectively, the processing unit 26 causes the weight history table to be updated such that $D_x$=13 ounces, $D_y$=10 ounces, and $I_x$=0. The subroutine 106 then returns to step 108.

Returning to step 116, if the post-scan scale 20 does not detect a weight increase, the subroutine 106 advances to step 120. Step 120 follows the same procedure outlined above in regard to step 68. In particular, the processing unit 26 determines if the user removed an item or items from the post-scan area 17. More specifically, the post-scan scale 20 generates an output signal indicative of the measured weight of the item or items which is sent to the processing unit 26 once the post-scan scale 20 detects that an item or items has been removed from either (1) the post-scan shelf 42b, or (2) one of the grocery bags 40. It should be appreciated that if the post-scan scale 20 detects a weight decrease thereon, such a weight decrease may be indicative of the user removing a single item from the post-scan area 17, or alternatively, if the user removes an item with each hand, the detected weight decrease may be indicative of two items being removed from the post-scan area 17. If the post-scan scale 20 detects a weight decrease, the subroutine 106 advances to step 142. If the post-scan scale 20 does not detect a weight decrease, the subroutine 106 loops back to step 112.

In step 142, the processing unit 26 updates the weight history table. More specifically, the processing unit 26 generates an output signal which is sent to the memory device 27 which causes the weight history table to be updated in the memory device 27 to (1) set the value of $D_x$ to the existing value of $D_y$, and thereafter (2) set the value of $D_y$ to the value of the weight decrease detected by the post-scan scale 20 in step 120. For example, if prior to detecting a weight decrease of 10 ounces in step 120, the stored weight values of $D_x$ and $D_y$ were 8½ ounces and 13 ounces, respectively, the processing unit 26 causes the weight history table to be updated such that $D_x$=13 ounces and $D_y$=10 ounces. The subroutine 106 then returns to step 108.

Returning now to step 124, if the stored weight increase value $I_x$ does not match the stored weight decrease value $D_x$, the subroutine 106 advances to step 114. In step 114, the processing unit 26 determines if the stored weight increase value $I_x$ indicative of a single item (having a weight value of $D_y$) being returned to the post-scan area 17. In particular, the processing unit 26 compares the weight value $I_x$ to the weight value $D_y$. If the weight value $I_x$ matches the weight value $D_y$, the subroutine 106 advances to step 144. If the weight value $I_x$ does not match the weight value $D_y$, the subroutine 106 advances to step 146.

In step 144, the processing unit 26 concludes that only one item (having a weight of $D_x$) remains displaced or otherwise removed from the post-scan area 17. This is true since apparently two items were displaced from the post-scan area 17, one of which (having a weight of $D_y$) was returned to the post-scan area 17 thereby leaving only the item associated with the weight value $D_x$ unaccounted for. As discussed above, the user presumably maintains no more than two items at a given time (one in each hand). Hence, if one item had a weight value of $D_y$, it can be inferred that the second item has a weight value of $D_x$. A displaced item control signal is generated and the subroutine 106 advances to step 148.

Step 148 follows the same procedure outlined above with regard to step 64. In particular, the processing unit 26 scans or reads the data communication lines 29, 43, and 49 in order to determine whether an item has been entered in the self-service checkout terminal 10. If an item entry has occurred, the processing unit 26 concludes that the unaccounted item associated with the previous weight decrease ($D_x$) was permanently removed from the post-scan area 17 (e.g. placed in a carryout cart for removal from the grocery store) thereby causing the subroutine 106 to end which in turn causes the itemization routine 56 to return to step 62 (see FIG. 5). This is true since after having removed the item from the post-scan area 17, the user would presumably be required to set the item down prior to scanning or otherwise entering a subsequent item. Hence, the processing unit 26 concludes the user permanently removed the item from the post-scan area 17. However, if an item entry has not occurred, the subroutine 106 advances to step 150.

Step 150 follows the same procedure outlined above in regard to step 76. In particular, the processing unit 26 determines if the user placed an item or items into the post-scan area 17. More specifically, the post-scan scale 20 generates an output signal indicative of the measured weight of the item or items which is sent to the processing unit 26 once the post-scan scale 20 detects a weight increase associated with an item or items being placed either (1) on the post-scan shelf 42b, or (2) into one of the grocery bags 40. If a weight increase is detected by the post-scan scale 20, the subroutine 106 advances to step 152. If the post-scan scale 20 does not detect a weight increase, the subroutine 106 advances to step 154.

In step 152, the processing unit 26 updates the weight history table. More specifically, the processing unit 26 generates an output signal which is sent to the memory device 27 which causes the weight history table to be updated in the memory device 27 to set the value of $I_y$ to the value of the weight increase detected by the post-scan scale 20 in step 150. For example, if the post-scan scale 20 detected a weight increase of 14 ounces in step 150, the processing unit 26 causes the weight history table to be updated such that $I_y$=14 ounces. The subroutine 106 then advances to step 156.

In step 156, the processing unit 26 determines if the weight of the item or items placed in the post-scan area 17 (as detected in step 150) matches the weight of the item that was removed from the post-scan area 17 during the previously detected weight decrease (having a weight value of $D_x$). In particular, the processing unit 26 looks up the stored values of $I_y$ and $D_x$ from the weight history table and thereafter compares the values thereof. If the value of $I_y$ matches the value of $D_x$, the processing unit 26 concludes that the item previously displaced from the post-scan area 17 (having a weight value of $D_x$) has been returned to the post-scan area 17 (as detected in step 150). Thereafter, a match control signal is generated and the subroutine 106 ends thereby causing the itemization routine 56 to return to step 62 (see FIG. 5). However, if the value of $I_y$ does not match the value of $D_x$, the processing unit 26 concludes that an item not previously removed from the post-scan area 17 was placed in the post-scan area 17. Thereafter, an improper-use control signal is generated and the subroutine 106 advances to step 158.

In step 158, the processing unit 26 increments the appropriate event logs and the aggregate log by a predetermined value. In particular, the processing unit 26 generates an output signal which is sent to the memory device 27 which causes the appropriate event logs and the aggregate log to be incremented in the memory device 27 by a predetermined value. Thereafter, the processing unit 26 compares the various event logs and the aggregate log to their respective threshold values in order to determine if any of the event logs have a predetermined relationship therewith. In particular, if the respective value of any of the event logs and/or the aggregate log equals or exceeds its respective threshold value, an intervention control signal is generated and appropriate store personnel is paged or otherwise summoned to intervene in the user's transaction. If after such intervention the user's transaction is permitted to continue, the subroutine 106 then ends thereby causing the itemization routine 56 to return to step 62 (see FIG. 5). It should be appreciated that store personnel may not allow the user's transaction to continue (e.g. if it is determined that the user intentionally operated the terminal 10 improperly to commit an impropriety such as theft) thereby causing the both the subroutine 106 and the itemization routine 56 to end which in turn causes the routine 50 (see FIG. 4) to return to step 52 in which the self-service checkout terminal 10 will remain idle until initialized by a subsequent user.

Returning to step 150, if the post-scan scale 20 does not detect a weight increase, the subroutine 106 advances to step 154. Step 154 follows the same procedure outlined above in regard to step 68. In particular, the processing unit 26 determines if the user removed an item or items from the post-scan area 17. More specifically, the post-scan scale 20 generates an output signal indicative of the measured weight of the item or items which is sent to the processing unit 26 once the post-scan scale 20 detects that an item or items has been removed from either (1) the post-scan shelf 42b, or (2) one of the grocery bags 40. It should be appreciated that if the post-scan scale 20 detects a weight decrease thereon, such a weight decrease may be indicative of the user removing a single item from the post-scan area 17, or alternatively, if the user removes an item with each hand, the detected weight decrease may be indicative of two items being removed from the post-scan area 17. If the post-scan scale 20 detects a weight decrease, the subroutine 106 advances to step 160. If the post-scan scale 20 does not detect a weight decrease, the subroutine 106 loops back to step 148.

In step 160, the processing unit 26 updates the weight history table. More specifically, the processing unit 26 generates an output signal which is sent to the memory device 27 which causes the weight history table to be updated in the memory device 27 to (1) set the value of $D_y$ to the value of the weight decrease detected by the post-scan scale 20 in step 154, and (2) set the value of $I_x$ to zero (0). For example, if the post-scan scale 20 detects a weight decrease of 10 ounces in step 154, the processing unit 26 causes the weight history table to be updated such that $D_y$=10 ounces and $I_x$=0. The subroutine 106 then returns to step 108.

Returning to step 114, if the weight value $I_x$ does not match the weight value $D_y$, the subroutine 106 advances to step 146. In step 146, the processing unit 26 compares the weight value $I_x$ to the weight value $D_y$. In particular, the processing unit 26 determines if the weight increase value $I_x$ is greater than the weight decrease value $D_y$. If the weight value $I_x$ is greater than the weight value $D_y$, the processing unit 26 concludes that an item was placed in the post-scan area 17 that had not been previously removed from the post-scan area 17. In particular, since the weight increase weight value $I_x$ did not match the weight decrease value $D_x$ (step 124), the weight decrease $D_y$ (step 114), or the sum thereof $D_x$+$D_y$ (step 122), the processing unit 26 concludes that two items are associated with the weight decrease value $D_y$ (i.e. the user simultaneously removed two items having a combined weight of $D_y$ from the post-scan area 17). Hence, if the weight increase value $I_x$ is greater than the weight decrease value $D_y$, the processing unit 26 concludes that the weight increase value $I_x$ is indicative of an item that was not previously removed from the post-scan area 17. Therefore, in step 146, if the weight value $I_x$ is greater than the weight value $D_y$, an improper use control signal is generated and the subroutine 106 advances to step 162. If the weight value $I_x$ is less than the weight value $D_y$ (and not equal to as determined in step 114), the subroutine 106 advances to step 164.

In step 162, the processing unit 26 26 increments the appropriate event logs and the aggregate log by a predetermined value. In particular, the processing unit 26 generates an output signal which is sent to the memory device 27 which causes the appropriate event logs and the aggregate log to be incremented in the memory device 27 by a predetermined value. Thereafter, the processing unit 26 compares the various event logs and the aggregate log to their respective threshold values in order to determine if any of the event logs have a predetermined relationship therewith. In particular, if the respective value of any of the event logs and/or the aggregate log equals or exceeds its respective threshold value, an intervention control signal is generated and appropriate store personnel is paged or otherwise summoned to intervene in the user's transaction. If after such intervention the user's transaction is permitted to continue, the subroutine 106 then ends thereby causing the itemization routine 56 to return to step 62 (see FIG. 5). It should be appreciated that store personnel may not allow the user's transaction to continue (e.g. if it is determined that the user intentionally operated the terminal 10 improperly to commit an impropriety such as theft) thereby causing the both the subroutine 106 and the itemization routine 56 to end which in turn causes the routine 50 (see FIG. 4) to return to step 52 in which the self-service checkout terminal 10 will remain idle until initialized by a subsequent user.

Returning now to step 146, if the weight value $I_x$ is less than the weight value $D_y$ (and not equal to as determined in step 114), the subroutine 106 advances to step 164. In step 164, the processing unit 26 concludes that only one item (having the weight of $D_y$=$I_x$) remains displaced or otherwise removed from the post-scan area 17. This is true since apparently two items (having a combined weight value of $D_y$) were displaced from the post-scan area 17, one of which (having a weight of $I_x$) was returned to the post-scan area 17 thereby leaving only the item associated with the weight value $D_y$–$I_x$ unaccounted for. As discussed above, the user presumably maintains no more than two items at a given time (one in each hand). Hence, if one item had a weight value of $I_x$, it can be inferred that the second item has a weight value of $D_y$–$I_x$. A displaced item control signal is generated an the subroutine 106 advances to step 166.

Step 166 follows the same procedure outlined above with regard to step 64. In particular, the processing unit 26 scans or reads the data communication lines 29, 43, and 49 in order to determine whether an item has been entered in the self-service checkout terminal 10. If an item entry has occurred, the processing unit 26 concludes the second or remaining item that was displaced or otherwise removed from the post-scan area 17 (having a weight value of $D_y$–$I_x$) has not yet been returned to the post-scan area 17 prior to entry of a subsequent item. Moreover, the possibility does exist that the item that was previously placed in the post-scan area 17 (having a weight value of less than $D_y$) was not actually one of the items which was removed from the post-scan area 17. Hence, if an item entry has occurred, an item-entry control signal is generated and the subroutine 106 advances to step 168. However, if an item entry has not occurred, the subroutine 106 advances to step 170.

In step 168, the processing unit 26 increments the appropriate event logs and the aggregate log by a predetermined value. In particular, the processing unit 26 generates an output signal which is sent to the memory device 27 which causes the appropriate event logs and the aggregate log to be incremented in the memory device 27 by a predetermined value. Thereafter, the processing unit 26 compares the various event logs and the aggregate log to their respective threshold values in order to determine if any of the event logs have a predetermined relationship therewith. In particular, if the respective value of any of the event logs and/or the aggregate log equals or exceeds its respective threshold value, an intervention control signal is generated and appropriate store personnel is paged or otherwise summoned to intervene in the user's transaction. If after such intervention the user's transaction is permitted to continue, the subroutine 106 ends and the itemization routine 56 returns to step 62 (see FIG. 5). It should be appreciated that store personnel may not allow the user's transaction to continue (e.g. if it is determined that the user intentionally operated the terminal 10 improperly to commit an impropriety such as theft) thereby causing the subroutine 106 and the itemization routine 56 (see FIG. 5) to end which in turn causes the routine 50 (see FIG. 4) to return to step 52 in which the self-service checkout terminal 10 will remain idle until initialized by a subsequent user.

Returning now to step 166, if an item entry has not occurred, the subroutine 106 advances to step 170. Step 166 follows the same procedure outlined above in regard to step 76. In particular, the processing unit 26 determines if the user placed an item or items into the post-scan area 17. More specifically, the post-scan scale 20 generates an output signal indicative of the measured weight of the item or items which is sent to the processing unit 26 once the post-scan scale 20 detects a weight increase associated with an item or items being placed either (1) on the post-scan shelf 42b, or (2) into one of the grocery bags 40. If a weight increase is detected by the post-scan scale 20, the subroutine 106 advances to step 172. If the post-scan scale 20 does not detect a weight increase, the subroutine 106 advances to step 174.

In step 172, the processing unit 26 updates the weight history table. More specifically, the processing unit 26 generates an output signal which is sent to the memory device 27 which causes the weight history table to be updated in the memory device 27 to set the value of $I_y$ to the value of the weight increase detected by the post-scan scale 20 in step 170. For example, if the post-scan scale 20 detected a weight increase of 14 ounces in step 170, the processing unit 26 causes the weight history table to be updated such that $I_y$=14 ounces. The subroutine 106 then advances to step 176.

In step 176, the processing unit 26 determines if the weight of the item or items placed in the post-scan area 17 (as detected in step 170) matches the weight of the item that was removed from the post-scan area 17 (having a weight value of $D_y$–$I_x$). In particular, the processing unit 26 looks up the stored values of $I_y$, $D_y$, and $I_x$ from the weight history table and thereafter compares the values thereof. If the value of $I_y$ matches the value of $D_y$–$I_x$, the processing unit 26 concludes that the item previously displaced from the post-scan area 17 (having a weight value of $D_y$–$I_x$) has been returned to the post-scan area 17 (as detected in step 170). Thereafter, a match control signal is generated and the subroutine 106 ends thereby causing the itemization routine 56 to return to step 62 (see FIG. 5). However, if the value of $I_y$ does not match the value of $D_y$–$I_x$, the processing unit 26 concludes that an item not previously removed from the post-scan area 17 was placed in the post-scan area 17 in step 170. Thereafter, an improper-use control signal is generated and the subroutine 106 advances to step 178.

In step 178, the processing unit 26 increments the appropriate event logs and the aggregate log by a predetermined value. In particular, the processing unit 26 generates an output signal which is sent to the memory device 27 which causes the appropriate event logs and the aggregate log to be incremented in the memory device 27 by a predetermined value. Thereafter, the processing unit 26 compares the various event logs and the aggregate log to their respective threshold values in order to determine if any of the event logs have a predetermined relationship therewith. In particular, if the respective value of any of the event logs and/or the aggregate log equals or exceeds its respective threshold value, an intervention control signal is generated and appropriate store personnel is paged or otherwise summoned to intervene in the user's transaction. If after such intervention the user's transaction is permitted to continue, the subroutine 106 then ends thereby causing the itemization routine 56 to return to step 62 (see FIG. 5). It should be appreciated that store personnel may not allow the user's transaction to continue (e.g. if it is determined that the user intentionally operated the terminal 10 improperly to commit an impropriety such as theft) thereby causing the both the subroutine 106 and the itemization routine 56 (see FIG. 5) to end which in turn causes the routine 50 (see FIG. 4) to return to step 52 in which the self-service checkout terminal 10 will remain idle until initialized by a subsequent user.

Returning to step 170, if the post-scan scale 20 does not detect a weight increase, the subroutine 106 advances to step 174. Step 174 follows the same procedure outlined above in regard to step 68. In particular, the processing unit 26 determines if the user removed an item or items from the post-scan area 17. More specifically, the post-scan scale 20 generates an output signal indicative of the measured weight of the item or items which is sent to the processing unit 26 once the post-scan scale 20 detects that an item or items has been removed from either (1) the post-scan shelf 42b, or (2) one of the grocery bags 40. It should be appreciated that if the post-scan scale 20 detects a weight decrease thereon, such a weight decrease may be indicative of the user removing a single item from the post-scan area 17, or alternatively, if the user removes an item with each hand, the detected weight decrease may be indicative of two items being removed from the post-scan area 17. If the post-scan scale 20 detects a weight decrease, the subroutine 106 advances to step 180. If the post-scan scale 20 does not detect a weight decrease, the subroutine 106 loops back to step 166.

In step 180, the processing unit 26 updates the weight history table. More specifically, the processing unit 26 generates an output signal which is sent to the memory device 27 which causes the weight history table to be updated in the memory device 27 to (1) set the value of $D_x$ to the value of $D_y$–$I_x$, (2) set the value of $D_y$ to the value of the weight decrease detected by the post-scan scale 20 in step 174, and (3) set the value of $I_x$ to zero (0). For example, if prior to detecting a weight decrease of 10 ounces in step 174, the stored weight values of $D_x$ and $D_y$ were 8½ ounces and 13 ounces, respectively, and the stored weight value of $I_x$ was 7 ounces, the processing unit 26 causes the weight history table to be updated such that $D_x$=6 ounces, $D_y$=10 ounces, and $I_x$=0. The subroutine 106 then returns to step 108.

Returning now to step 76 of the itemization routine 56 (see FIG. 5), if a weight increase is not detected by the post-scan scale 20, the routine 56 advances to step 80. Step 80 follows the same procedure outlined above in regard to step 68. In particular, the processing unit 26 determines if the user removed an item or items from the post-scan area 17. More specifically, the post-scan scale 20 generates an output signal indicative of the measured weight of the item or items which is sent to the processing unit 26 once the post-scan scale 20 detects that an item or items has been removed from either (1) the post-scan shelf 42b, or (2) one of the grocery bags 40. It should be appreciated that if the post-scan scale 20 detects a weight decrease thereon, such a weight decrease may be indicative of the user removing a single item from the post-scan area 17, or alternatively, if the user removes an item with each hand, the detected weight decrease may be indicative of two items being removed from the post-scan area 17. If the post-scan scale 20 detects a weight decrease, the routine 56 advances to step 182. If the post-scan scale 20 does not detect a weight decrease, the routine 56 loops back to step 74.

In step 182, the processing unit 26 updates the weight history table. More specifically, the processing unit 26 generates an output signal which is sent to the memory device 27 which causes the weight history table to be updated in the memory device 27 to set the value of $D_y$ to the value of the weight decrease detected by the post-scan scale 20 in step 80. For example, if the post-scan scale 20 detected a weight decrease of 10 ounces in step 80, the processing unit 26 causes the weight history table to be updated such that $D_y$=10 ounces. The routine 56 then advances to the verification subroutine 106 in the manner previously discussed.

Returning now to step 68, if the post-scan scale 20 does not detect a weight decrease, the routine advances to step 72. Step 72 follows the same procedure outlined above in regard to step 76. In particular, the processing unit 26 determines if the user placed an item or items into the post-scan area 17. More specifically, the post-scan scale 20 generates an output signal indicative of the measured weight of the item which is sent to the processing unit 26 once the post-scan scale 20 detects a weight increase associated with an item or items being placed either (1) on the post-scan shelf 42b, or (2) into one of the grocery bags 40. If a weight increase is detected by the post-scan scale 20, the processing unit 26 concludes that an item or items have been placed in the post-scan area 17 without having first been entered into the self-service checkout terminal 10. This is true since the user apparently did not enter an item (step 64) or remove an item from the post-scan area 17 (step 68), yet an item or items were placed in the post-scan area 17. Hence, if a weight increase is detected by the post-scan scale 20, an improper-use control signal is generated and the routine 56 advances to step 184. If the post-scan scale 20 does not detect a weight increase, the processing unit 26 concludes that there is no present user activity associated with the self-service checkout terminal 10 since the user is apparently not entering an item (step 64) or removing or placing items from/into the post-scan area 17 (steps 68, 72, respectively) thereby causing the routine 56 to loop back to step 62.

In step 184, the processing unit 26 increments the appropriate event logs and the aggregate log by a predetermined value. In particular, the processing unit 26 generates an output signal which is sent to the memory device 27 which causes the appropriate event logs and the aggregate log to be incremented in the memory device 27 by a predetermined value. Thereafter, the processing unit 26 compares the various event logs and the aggregate log to their respective threshold values in order to determine if any of the event logs have a predetermined relationship therewith. In particular, if the respective value of any of the event logs and/or the aggregate log equals or exceeds its respective threshold value, an intervention control signal is generated and appropriate store personnel is paged or otherwise summoned to intervene in the user's transaction. If after such intervention the user's transaction is permitted to continue, the routine 56 returns to step 62. It should be appreciated that store personnel may not allow the user's transaction to continue (e.g. if it is determined that the user intentionally operated the terminal 10 improperly to commit an impropriety such as theft) thereby causing the routine 56 to end which in turn causes the routine 50 (see FIG. 4) to return to step 52 in which the self-service checkout terminal 10 will remain idle until initialized by a subsequent user.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

What is claimed is:

1. A method of monitoring item shuffling in a post-scan area of a self-service checkout terminal, with the post-scan area including a post-scan surface, comprising the steps of:

detecting removal of a first number of items from the post-scan surface and generating a first weight decrease value in response thereto which corresponds to the weight of the first number of items;

detecting placement of a second number of items onto the post-scan surface and generating a first weight increase value in response thereto which corresponds to the weight of the second number of items; and comparing the first weight decrease value to the first weight increase value and generating a first match control signal in response thereto if the first weight decrease value matches the first weight increase value.

2. The method of claim 1, further comprising the step of:

generating an improper-use control signal if the first weight increase value (i) does not match the first weight decrease value, and (ii) is greater than the first weight decrease value.

3. The method of claim 2, further comprising the steps of:

updating an electronic log value in response to generation of the improper-use control signal; and comparing the electronic log value to a log threshold and generating an intervention signal in response thereto if the electronic log value has a predetermined relationship to the log threshold.

4. The method of claim 1, further comprising the steps of:

detecting placement of a third number of items onto the post-scan surface and generating a second weight increase value in response thereto which corresponds to the weight of the third number of items; and comparing the first weight decrease value to a sum of the first weight increase value and the second weight increase value and generating a second match control signal in response thereto if the first weight decrease value matches the sum of the first weight increase value and the method weight increase value.

5. The method of claim 4, further comprising the steps of:

generating an improper-use control signal if the first weight decrease value does not match the sum of the first weight increase value and the second weight increase value.

6. The method of claim 5, further comprising the steps of:

updating an electronic log value in response to generation of the improper-use control signal; and comparing the electronic log value to a log threshold and generating an intervention signal in response thereto if the electronic log value has a predetermined relationship to the log threshold.

7. The method of claim 4, further comprising the steps of:

generating an item-displaced control signal if the first weight increase value (i) does not match the first weight decrease value, and (ii) is less than the first weight decrease value;

generating an item-entered control signal if the user enters a subsequent item into the self-service checkout terminal; and generating an improper-use control signal if the item-entered control signal is generated (i) subsequent to generation of the item-displaced control signal, and (ii) prior to generation of the second match control signal.

8. The method of claim 7, further comprising the steps of:

updating an electronic log value in response to generation of the improper-use control signal; and comparing the electronic log value to a log threshold and generating an intervention signal in response thereto if the electronic log value has a predetermined relationship to the log threshold.

9. The method of claim 1, further comprising the steps of:

detecting removal of a third number of items from the post-scan surface and generating a second weight decrease value in response thereto which corresponds to the weight of the third number of items; and comparing the sum of the first weight decrease value and the second weight decrease value to the first weight increase value and generating a second match control signal in response thereto if the sum of the first weight decrease value and the second weight decrease value matches the first weight increase value.

10. The method of claim 1, wherein:

the post-scan surface includes (i) a post-scan shelf, and (ii) a bagwell having a grocery container positioned therein, a weight scale is positioned so as to detect weight of items positioned both on the post-scan shelf and in the grocery container, the removal detecting step includes the step of detecting removal of the first number of items from the post-scan shelf with the weight scale, and the placement detecting step includes the step of detecting placement of the second number of items into the grocery container with the weight scale.

11. The method of claim 1, wherein:

a weight scale is positioned so as to detect weight of items positioned on the post-scan surface, the removal detecting step includes the step of detecting removal of the first number of items from the post-scan surface with the weight scale, and the placement detecting step includes the step of detecting placement of the second number of items onto the post-scan surface with the weight scale.

12. A method of monitoring item shuffling in a post-scan area of a self-service checkout terminal having (i) a post-scan shelf, (ii) a bagwell with a grocery container positioned therein, and (iii) a weight scale positioned so as to detect weight of items positioned both on the post-scan shelf and in the grocery container, comprising the steps of:

detecting removal of a first number of items from the post-scan shelf with the weight scale and generating a first weight decrease value in response thereto which corresponds to the weight of the first number of items;

detecting placement of a second number of items into the grocery container with the weight scale and generating a first weight increase value in response thereto which corresponds to the weight of the second number of items; and comparing the first weight decrease value to the first weight increase value and generating a first match control signal in response thereto if the first weight decrease value matches the first weight increase value.

13. The method of claim 12, further comprising the step of:

generating an improper-use control signal if the first weight increase value (i) does not match the first weight decrease value, and (ii) is greater than the first weight decrease value.

14. The method of claim 13, further comprising the steps of:

updating an electronic log value in response to generation of the improper-use control signal; and comparing the electronic log value to a log threshold and generating an intervention signal in response thereto if the electronic log value has a predetermined relationship to the log threshold.

15. The method of claim 12, further comprising the steps of:

detecting placement of a third number of items into the grocery container and generating a second weight increase value in response thereto which corresponds to the weight of the third number of items; and comparing the first weight decrease value to a sum of the first weight increase value and the second weight increase value and generating a second match control signal in response thereof if the first weight decrease value matches the sum of the first weight increase value and the second weight increase value.

16. The method of claim 15, further comprising the steps of:

generating an improper-use control signal if the first weight decrease value does not match the sum of the first weight increase value and the second weight increase value.

17. The method of claim 16, further comprising the steps of:

updating an electronic log value in response to generation of the improper-use control signal; and comparing the electronic log value to a log threshold and generating an intervention signal in response thereto if the electronic log value has a predetermined relationship to the log threshold.

18. The method of claim 15, further comprising the steps of:

generating an item-displaced control signal if the first weight increase value (i) does not match the first weight decrease value, and (ii) is less than the first weight decrease value;

generating an item-entered control signal if the user enters a subsequent item into the self-service checkout terminal; and generating an improper-use control signal if the item-entered control signal is generated (i) subsequent to generation of the item-displaced control signal, and (ii) prior to generation of the second match control signal.

19. The method of claim 18, further comprising the steps of:

updating an electronic log value in response to generation of the improper-use control signal; and comparing the electronic log value to a log threshold and generating an intervention signal in response thereto if the electronic log value has a predetermined relationship to the log threshold.

20. The method of claim 12, further comprising the steps of:

detecting removal of a third number of items from the post-scan shelf and generating a second weight decrease value in response thereto which corresponds to the weight of the third number of items; and comparing the sum of the first weight decrease value and the second weight decrease value to the first weight increase value and generating a second match control signal in response thereto if the sum of the first weight decrease value and the second weight decrease value matches the first weight increase value.

*21. A method of monitoring item movement in a post-scan area of a self-service checkout terminal, comprising the steps of:*

*detecting and recording a weight decrease resulting from removal of one or more items from the post-scan area of the self-service checkout terminal;*

*detecting a weight increase resulting from placement of one or more items in the post-scan area of the self-service checkout terminal; and*

*generating a match signal if the weight increase matches the weight decrease.*

*22. The method of claim 21, further comprising the step of:*

*generating an improper-use signal if the weight increase exceeds the weight decrease.*

*23. The method of claim 22, further comprising the steps of:*

*updating an electronic log if the improper-use signal is generated; and*

*generating an intervention signal if the updated log satisfies a threshold condition.*

*24. The method of claim 21, further comprising the steps of:*

*detecting a further weight increase resulting from placement of one or more additional items in the post-scan area; and*

*generating a match signal if the total of weight increases matches the weight decrease.*

*25. The method of claim 24, further comprising the steps of:*

*generating an improper-use signal if the total of weight increases does not match the weight decrease.*

*26. The method of claim 25, comprising the further steps of:*

*updating an electronic log if the improper-use control signal is generated; and*

*generating an intervention signal if the updated log satisfies a threshold condition.*

*27. The method of claim 24, comprising the further step of:*

*generating an improper-use signal if a subsequent item is entered into the terminal before the weight of all removed items is restored to the post-scan area.*

*28. The method of claim 27, comprising the further steps of:*

*updating an electronic log in response to generation of the improper-use signal; and*

*generating an intervention signal if the updated log satisfies a threshold condition.*

*29. The method of claim 21, comprising the further steps of:*

*detecting and recording a further weight decrease resulting from removal of one or more additional items from the post-scan area; and*

*generating a match signal if the total weight increases match the total weight decreases.*

*30. The method of claim 21, wherein:*

*the post-scan area includes a bagwell having a grocery container positioned therein,*

*a weight scale is positioned so as to detect weight of items in the grocery container,*

*removal of items from the post-scan area is detected with the weight scale, and*

*placement of items into the post-scan area is detected with the weight scale.*

*31. The method of claim 21, in which:*

*the manner in which a user handles items during operation of the self-service checkout terminal is monitored with a video camera.*

*32. The method of claim 21, in which:*

*an instructional message is communicated via a display monitor if the detected weight increase does not match the recorded weight decrease.*

*33. The method of claim 21, in which:*

*an instructional message is communicated via a voice generating device if the detected weight increase does not match the recorded weight decrease.*

*34. The method of claim 21, in which:*

*an instructional message is communicated via an audible tone generating device if the detected weight increase does not match the recorded weight decrease.*

*35. The method of claim 21, in which:*

*a processor concludes that a user has permanently removed a removed item from the post-scan area if another item is entered before the match signal is generated.*

*36. The method of claim 21, including the further step of:*

*maintaining and updating a scale history table to track the usage of a weight scale in the post-scan area for detecting the weight decrease and increase.*

*37. The method of claim 36, in which:*

*a processor concludes that no unaccounted for item or items have been placed in the post-scan area based on the content of the scale history table.*

*38. A method of monitoring item movement in a post-scan area of a self-service checkout terminal, comprising the steps of:*

*detecting a weight increase resulting from placement of one or more items in the post-scan area of the self-service checkout terminal;*

*determining if the weight increase corresponds to an expected weight of a previously entered item or to a previously detected and recorded weight decrease; and*

*if the weight increase does not correspond to the expected weight of the previously entered item or to the previously detected and recorded weight decrease, communicating an instructional message instructing a user to remove the item or items from the post-scan area and to enter the item or items for purchase.*

*39. The method of claim 38, in which:*

*the message is communicated via a display monitor and a voice generating device.*

*40. The method of claim 38, including the further step of:*

*communicating initialization instructions to a user via a display monitor.*

*41. The method of claim 40, in which:*

*the initialization instructions instruct the user to touch a particular area of the display monitor in order to select a desired method of payment for entered items.*

*42. The method of claim 40, in which:*

*the initialization instructions instruct the user to push a particular button on a data input device in order to select a desired method of payment for entered items.*

*43. The method of claim 40, in which:*

*the initialization instructions instruct the user to identify himself or herself by inserting a card into a card reader.*

*44. A method of monitoring item movement in a post-scan area of a self-service checkout terminal, comprising the steps of:*

*detecting removal of a first item from the post-scan area of the self-service checkout terminal by detecting a weight decrease caused by the removal of the first item, and also recording the weight decrease caused by the removal of the first item;*

*detecting placement of a second item in the post-scan area of the self-service checkout terminal by detecting a weight increase caused by the placement of the second item; and*

*generating a match signal if a match between the weight increase and the recorded weight decrease indicates that the second item is the first item.*

*45. A method comprising the steps of:*

*providing a self-service checkout terminal having a scanner that enters items for purchase and a scale that weighs the items on a post-scan surface;*

*providing a security system that differentiates between entered and non-entered items placed on the post-scan surface;*

*wherein said security system employs the scale to detect removal of one of the items from the post-scan surface by detecting a weight decrease caused by the removal of the one item from the post-scan surface, said security system recording the weight decrease, said security system detecting replacement of the one item on the post-scan surface by recognizing a match between a weight increase and the recorded weight decrease.*

*46. The method of claim 45 including the further step of providing an automated teller machine to pay for the entered items placed on the post-scan surface.*

*47. The method of claim 45 including the further step of providing a cash acceptor to pay for the entered items placed on the post-scan surface.*

*48. The method of claim 47 including the further step of providing a currency dispenser to return change when a user inserts currency into the cash acceptor.*

*49. The method of claim 48 including the further step of providing a coin dispenser to return change when the user inserts currency into the cash acceptor.*

*50. A method comprising the steps of:*

*providing a self-service checkout terminal having a scanner that enters items for purchase and a scale that weighs the items on a post-scan surface;*

*providing a security system that employs the scale to detect removal of one of the items from the post-scan surface by detecting a weight decrease caused by the removal of the one item from the post-scan surface, said security system recording the weight decrease, and replacement of the one item on the post-scan surface by detecting a weight increase caused by the replacement of the one item on the post-scan surface;*

*wherein said security system generates a match signal before another item of the items is entered and when a match between the weight increase and the recorded weight decrease indicates that the one item removed from the post-scan surface has been placed back on the post-scan surface.*

*51. The method of claim 50 in which the security system concludes that a user has permanently removed the one item from the post-scan surface if the other item is entered before the match signal is generated.*

*52. The method of claim 50 in which the security system concludes whether any unaccounted for item or items have been placed on the post-scan surface based on a recorded history of readings of the scale.*

*53. A method comprising the steps of:*

*providing a self-service checkout terminal having a scanner that enters items for purchase and a scale that weighs the items on a post-scan surface;*

*providing a security system that employs the scale to detect removal of one of the items from the post-scan surface by detecting a weight decrease caused by the removal of the weight one item from the post-scan surface, said security system recording the weight decrease, and replacement of the one item on the post-scan surface by detecting a weight increase caused by placement of another item on the post-scan surface;*

*wherein said security system generates an improper-use signal if a mismatch between the weight increase and the recorded weight decrease indicates that the one item removed from the post-scan surface has been replaced by the other item having a different weight.*

*54. A method comprising the steps of:*

*providing a self-service checkout terminal having a scanner that enters items for purchase and a scale that weighs the items on a post-scan surface;*

*providing a security system that employs the scale to detect removal of one of the items from the post-scan surface by detecting a weight decrease caused by the removal of the one item from the post-scan surface, said security system recording the weight decrease, and replacement of the one item on the post-scan surface by detecting a weight increase caused by the placement of another item on the post-scan surface;*

*wherein said security system generates an improper-use signal if a mismatch between the weight increase the recorded weight decrease indicates that the one item removed from the post-scan surface has been replaced by the other item having a greater weight.*

*55. The method of claim 54 in which, if the one item removed from the post-scan surface is replaced by the other item having a greater weight, the security system instructs a user to remove the other item from the post-scan surface.*

*56. A method comprising the steps of:*

*providing a self-service checkout terminal having a scanner that enters items for purchase and a scale that weighs the items on a post-scan surface;*

*providing a security system that employs the scale to detect removal of one of the items from the post-scan surface by detecting a weight decrease caused by the removal of the one item from the post-scan surface, said security system recording the weight decrease, and replacement of another item on the post-scan surface by detecting a weight increase caused by the placement of the other item on the post-scan surface;*

*wherein said security system generates an improper-use signal if a mismatch between the weight increase and the recorded weight decrease indicates that the one item removed from the post-scan surface has been replaced by the other item having a lesser weight.*

*57. A method comprising the steps of:*

*providing a self-service checkout terminal having a scanner that enters items for purchase and a scale that weighs the items on a post-scan surface;*

*providing a security system that employs the scale to detect placement of one or more unentered items on the post-scan surface of the self-service checkout terminal by detecting a weight increase resulting from placement of one or more items in the post-scan surface, determining if the weight increase corresponds to an expected weight of a previously entered item or to a previously detected and recorded weight decrease and identifying the item or items as unentered if the weight increase caused by the placement of the one or more items does not correspond to the expected weight of the previously entered item or the previously entered items or to the previously detected and recorded weight decrease or the previously detected and recorded weight decreases;*

*wherein said security system communicates an instructional message to a user if the one or more unentered items are placed on the post-scan surface.*

* * * * *